US012672943B2

(12) United States Patent
Saphier

(10) Patent No.: US 12,672,943 B2
(45) Date of Patent: Jul. 7, 2026

(54) CAPTURE OF INTRAORAL FEATURES FROM NON-DIRECT VIEWS

(71) Applicant: Align Technology, Inc., San Jose, CA (US)

(72) Inventor: Ofer Saphier, Rechovot (IL)

(73) Assignee: Align Technology, Inc., San Jose, CA (US)

( * ) Notice: Subject to any disclaimer, the term of this patent is extended or adjusted under 35 U.S.C. 154(b) by 389 days.

(21) Appl. No.: 18/331,873

(22) Filed: Jun. 8, 2023

(65) Prior Publication Data

US 2023/0414331 A1 Dec. 28, 2023

Related U.S. Application Data

(60) Provisional application No. 63/355,011, filed on Jun. 23, 2022.

(51) Int. Cl.
*A61C 9/00* (2006.01)
*A61C 13/00* (2006.01)
*G06T 17/00* (2006.01)

(52) U.S. Cl.
CPC ........ *A61C 9/0053* (2013.01); *A61C 13/0004* (2013.01); *G06T 17/00* (2013.01); *G06T 2207/30036* (2013.01)

(58) Field of Classification Search
None
See application file for complete search history.

(56) References Cited

U.S. PATENT DOCUMENTS

| | | | |
|---|---|---|---|
| 6,099,314 | A | 8/2000 | Kopelman et al. |
| 6,334,772 | B1 | 1/2002 | Taub et al. |
| 6,334,853 | B1 | 1/2002 | Kopelman et al. |
| 6,463,344 | B1 | 10/2002 | Pavlovskaia et al. |
| 6,542,249 | B1 | 4/2003 | Kofman et al. |
| 6,633,789 | B1 | 10/2003 | Nikolskiy et al. |
| 6,664,986 | B1 | 12/2003 | Kopelman et al. |
| 6,697,164 | B1 | 2/2004 | Babayoff et al. |
| 6,845,175 | B2 | 1/2005 | Kopelman et al. |
| 6,979,196 | B2 | 12/2005 | Nikolskiy et al. |
| 7,030,383 | B2 | 4/2006 | Babayoff et al. |
| 7,202,466 | B2 | 4/2007 | Babayoff et al. |
| 7,255,558 | B2 | 8/2007 | Babayoff et al. |
| 7,286,954 | B2 | 10/2007 | Kopelman et al. |
| 7,319,529 | B2 | 1/2008 | Babayoff |
| 7,373,286 | B2 | 5/2008 | Nikolskiy et al. |

(Continued)

*Primary Examiner* — Mark R Milia
(74) *Attorney, Agent, or Firm* — Lowenstein Sandler ILP

(57) ABSTRACT

Methods and systems for intraoral scanning and generation of 3D surfaces based on intraoral scans are described. In one example a system includes an intraoral scanner and a computing device operatively coupled to the intraoral scanner. The computing device receives an indication that a tool that provides supplemental surface data will be used during intraoral scanning. The computing device implements a supplemental surface data scanning mode in which a three-dimensional (3D) surface of a dental site that is generated from intraoral scan data is supplemented with additional surface data determined based at least in part on properties of the tool, wherein the additional surface data is for a first portion of the 3D surface that is hidden from direct viewing by the intraoral scanner during intraoral scanning.

30 Claims, 24 Drawing Sheets

(56)  References Cited

U.S. PATENT DOCUMENTS

| | | | |
|---|---|---|---|
| 7,507,088 | B2 | 3/2009 | Taub et al. |
| 7,545,372 | B2 | 6/2009 | Kopelman et al. |
| 7,698,068 | B2 | 4/2010 | Babayoff |
| 7,916,911 | B2 | 3/2011 | Kaza et al. |
| 8,108,189 | B2 | 1/2012 | Chelnokov et al. |
| 8,244,028 | B2 | 8/2012 | Kuo et al. |
| 8,587,582 | B2 | 11/2013 | Matov et al. |
| 8,948,482 | B2 | 2/2015 | Levin |
| D742,518 | S | 11/2015 | Barak et al. |
| 9,192,305 | B2 | 11/2015 | Levin |
| 9,261,356 | B2 | 2/2016 | Lampert et al. |
| 9,261,358 | B2 | 2/2016 | Atiya et al. |
| 9,299,192 | B2 | 3/2016 | Kopelman |
| D760,901 | S | 7/2016 | Barak et al. |
| 9,393,087 | B2 | 7/2016 | Moalem |
| 9,408,679 | B2 | 8/2016 | Kopelman |
| 9,431,887 | B2 | 8/2016 | Boltanski |
| 9,439,568 | B2 | 9/2016 | Atiya et al. |
| 9,451,873 | B1 | 9/2016 | Kopelman et al. |
| D768,861 | S | 10/2016 | Barak et al. |
| D771,817 | S | 11/2016 | Barak et al. |
| 9,491,863 | B2 | 11/2016 | Boltanski |
| D774,193 | S | 12/2016 | Makmel et al. |
| 9,510,757 | B2 | 12/2016 | Kopelman et al. |
| 9,660,418 | B2 | 5/2017 | Atiya et al. |
| 9,668,829 | B2 | 6/2017 | Kopelman |
| 9,675,430 | B2 | 6/2017 | Verker et al. |
| 9,693,839 | B2 | 7/2017 | Atiya et al. |
| 9,717,402 | B2 | 8/2017 | Lampert et al. |
| 9,724,177 | B2 | 8/2017 | Levin |
| 9,844,426 | B2 | 12/2017 | Atiya et al. |
| 10,076,389 | B2 | 9/2018 | Wu et al. |
| 10,098,714 | B2 | 10/2018 | Kuo |
| 10,108,269 | B2 | 10/2018 | Sabina et al. |
| 10,111,581 | B2 | 10/2018 | Makmel |
| 10,111,714 | B2 | 10/2018 | Kopelman et al. |
| 10,123,706 | B2 | 11/2018 | Elbaz et al. |
| 10,136,972 | B2 | 11/2018 | Sabina et al. |
| 10,380,212 | B2 | 8/2019 | Elbaz et al. |
| 10,390,913 | B2 | 8/2019 | Sabina et al. |
| 10,453,269 | B2 | 10/2019 | Furst |
| 10,456,043 | B2 | 10/2019 | Atiya et al. |
| 10,499,793 | B2 | 12/2019 | Ozerov et al. |
| 10,504,386 | B2 | 12/2019 | Levin et al. |
| 10,507,087 | B2 | 12/2019 | Elbaz et al. |
| 10,517,482 | B2 | 12/2019 | Sato et al. |
| 10,695,150 | B2 | 6/2020 | Kopelman et al. |
| 10,708,574 | B2 | 7/2020 | Furst et al. |
| 10,772,506 | B2 | 9/2020 | Atiya et al. |
| 10,813,727 | B2 | 10/2020 | Sabina et al. |
| 10,888,399 | B2 | 1/2021 | Kopelman et al. |
| 10,952,816 | B2 | 3/2021 | Kopelman |
| 10,980,613 | B2 | 4/2021 | Shanjani et al. |
| 11,013,581 | B2 | 5/2021 | Sabina et al. |
| D925,739 | S | 7/2021 | Shalev et al. |
| 11,096,765 | B2 | 8/2021 | Atiya et al. |
| 11,238,586 | B2 | 2/2022 | Minchenkov et al. |
| 11,367,192 | B2 | 6/2022 | Kopelman et al. |
| 11,455,727 | B2 | 9/2022 | Minchenkov et al. |
| 11,478,132 | B2 | 10/2022 | Kopelman et al. |
| 11,563,929 | B2 | 1/2023 | Saphier et al. |
| 11,633,268 | B2 | 4/2023 | Moalem et al. |
| 11,707,238 | B2 | 7/2023 | Moshe et al. |
| RE49,605 | E | 8/2023 | Kopelman |
| 2019/0388193 | A1 | 12/2019 | Saphier et al. |
| 2020/0281700 | A1 | 9/2020 | Kopelman et al. |
| 2020/0281702 | A1 | 9/2020 | Kopelman et al. |
| 2021/0030503 | A1 | 2/2021 | Shalev et al. |
| 2021/0059796 | A1 | 3/2021 | Weiss et al. |
| 2021/0121049 | A1 | 4/2021 | Rudnitsky et al. |
| 2021/0128281 | A1 | 5/2021 | Peleg |
| 2021/0137653 | A1 | 5/2021 | Saphier et al. |
| 2021/0196152 | A1 | 7/2021 | Saphier et al. |
| 2022/0151756 | A1* | 5/2022 | Pesach ................ A61B 5/4547 |

* cited by examiner

100

Figure 2A:
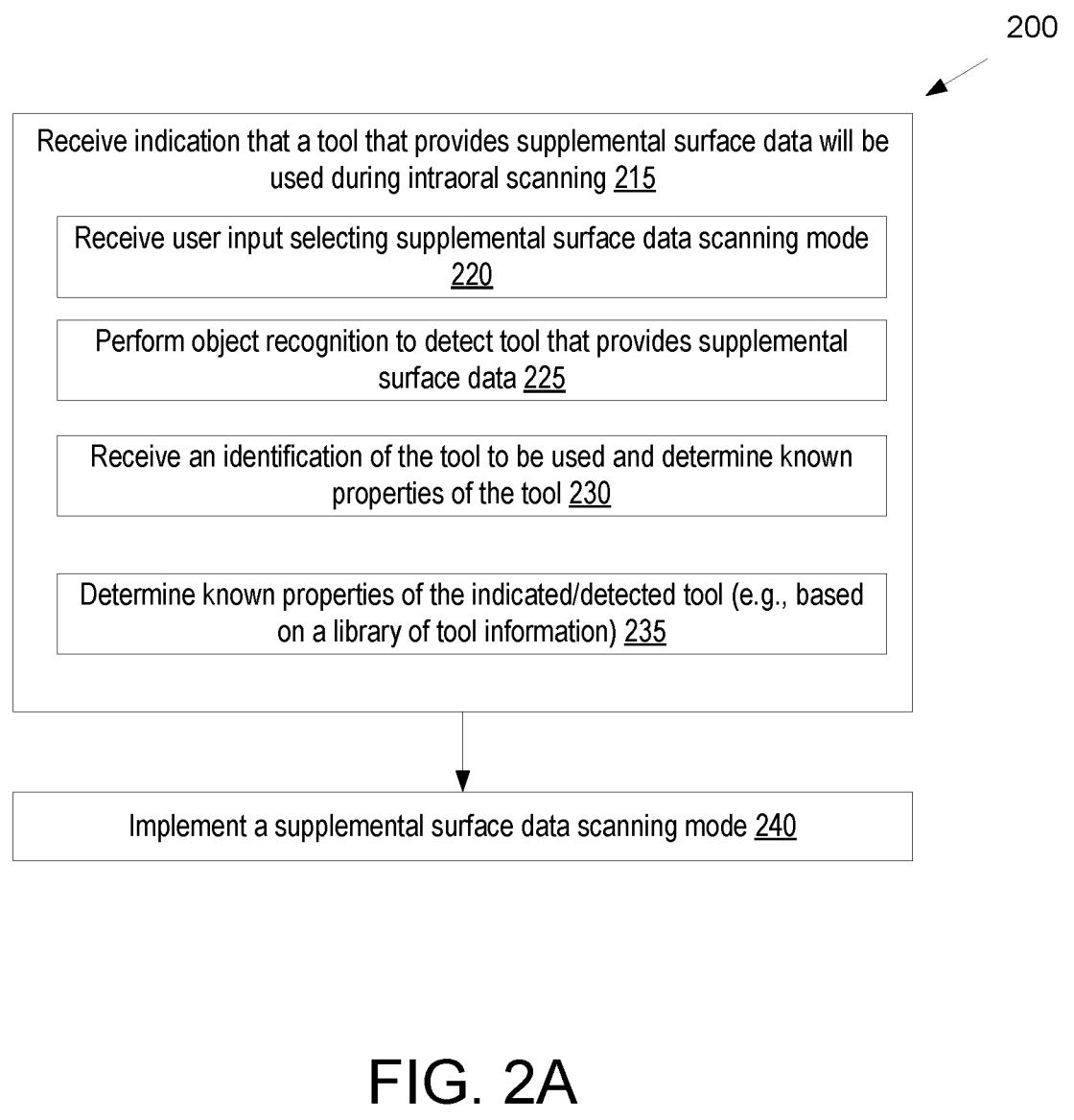

200

Receive indication that a tool that provides supplemental surface data will be used during intraoral scanning 215

Receive user input selecting supplemental surface data scanning mode 220

Perform object recognition to detect tool that provides supplemental surface data 225

Receive an identification of the tool to be used and determine known properties of the tool 230

Determine known properties of the indicated/detected tool (e.g., based on a library of tool information) 235

Implement a supplemental surface data scanning mode 240

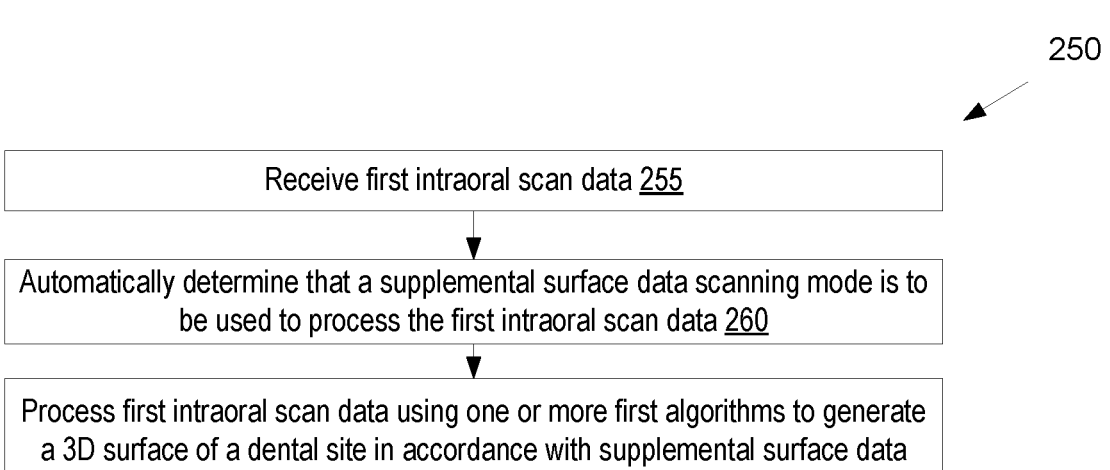

| Receive first intraoral scan data 255 |
| Automatically determine that a supplemental surface data scanning mode is to be used to process the first intraoral scan data 260 |
| Process first intraoral scan data using one or more first algorithms to generate a 3D surface of a dental site in accordance with supplemental surface data scanning mode 265 |

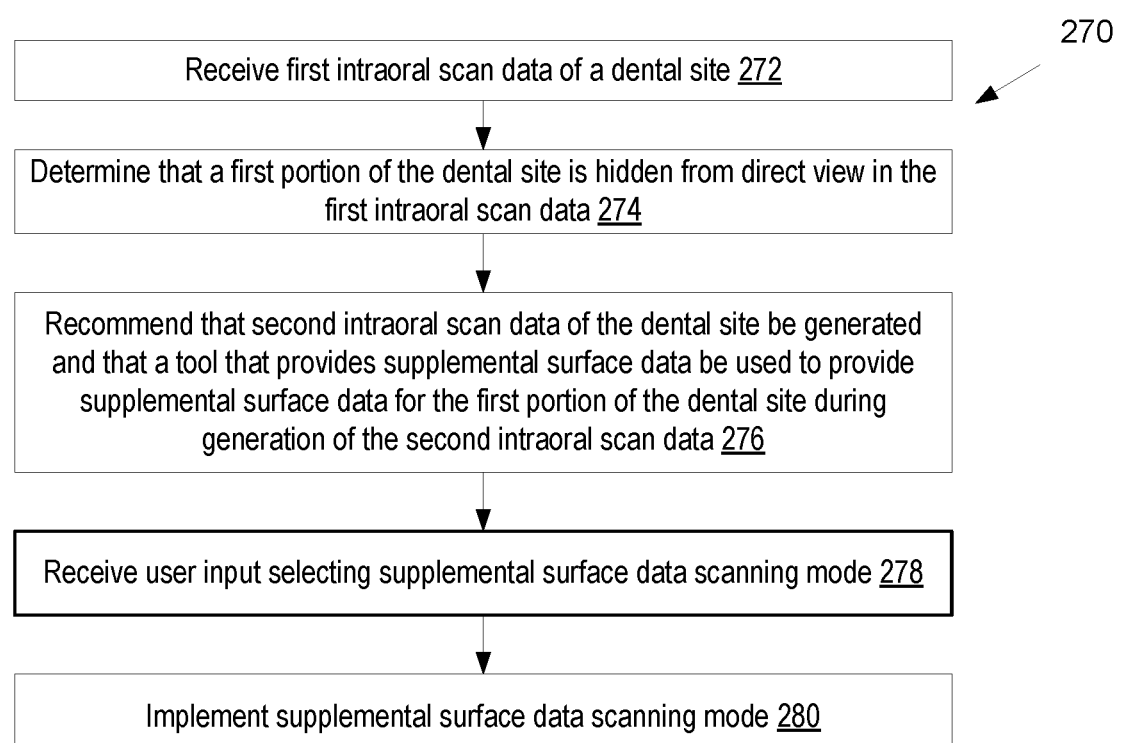

| Receive first intraoral scan data of a dental site 272 |
| Determine that a first portion of the dental site is hidden from direct view in the first intraoral scan data 274 |
| Recommend that second intraoral scan data of the dental site be generated and that a tool that provides supplemental surface data be used to provide supplemental surface data for the first portion of the dental site during generation of the second intraoral scan data 276 |
| Receive user input selecting supplemental surface data scanning mode 278 |
| Implement supplemental surface data scanning mode 280 |

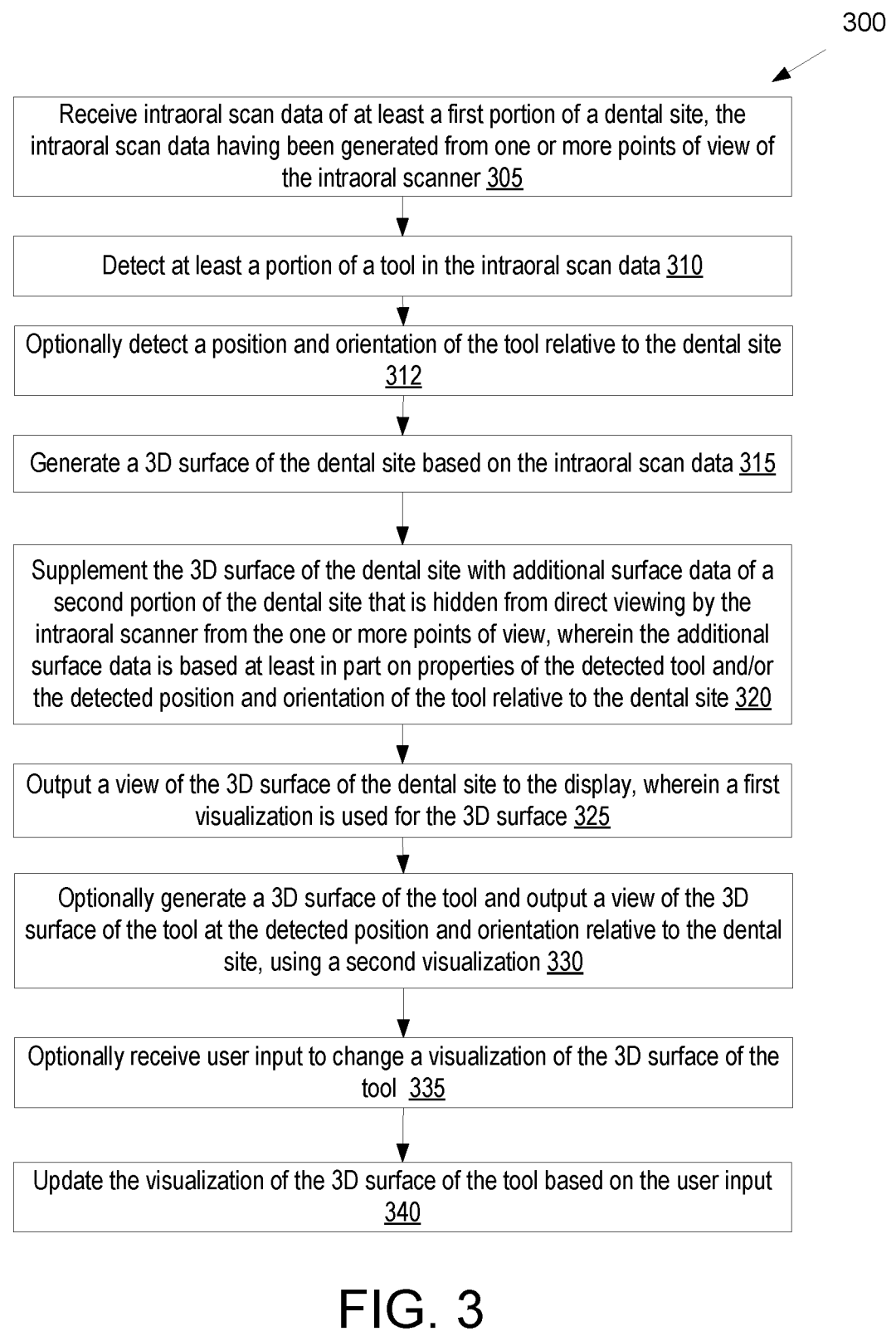

Receive intraoral scan data of at least a first portion of a dental site, the intraoral scan data having been generated from one or more points of view of the intraoral scanner 305

Detect at least a portion of a tool in the intraoral scan data 310

Optionally detect a position and orientation of the tool relative to the dental site 312

Generate a 3D surface of the dental site based on the intraoral scan data 315

Supplement the 3D surface of the dental site with additional surface data of a second portion of the dental site that is hidden from direct viewing by the intraoral scanner from the one or more points of view, wherein the additional surface data is based at least in part on properties of the detected tool and/or the detected position and orientation of the tool relative to the dental site 320

Output a view of the 3D surface of the dental site to the display, wherein a first visualization is used for the 3D surface 325

Optionally generate a 3D surface of the tool and output a view of the 3D surface of the tool at the detected position and orientation relative to the dental site, using a second visualization 330

Optionally receive user input to change a visualization of the 3D surface of the tool 335

Update the visualization of the 3D surface of the tool based on the user input 340

FIG. 3

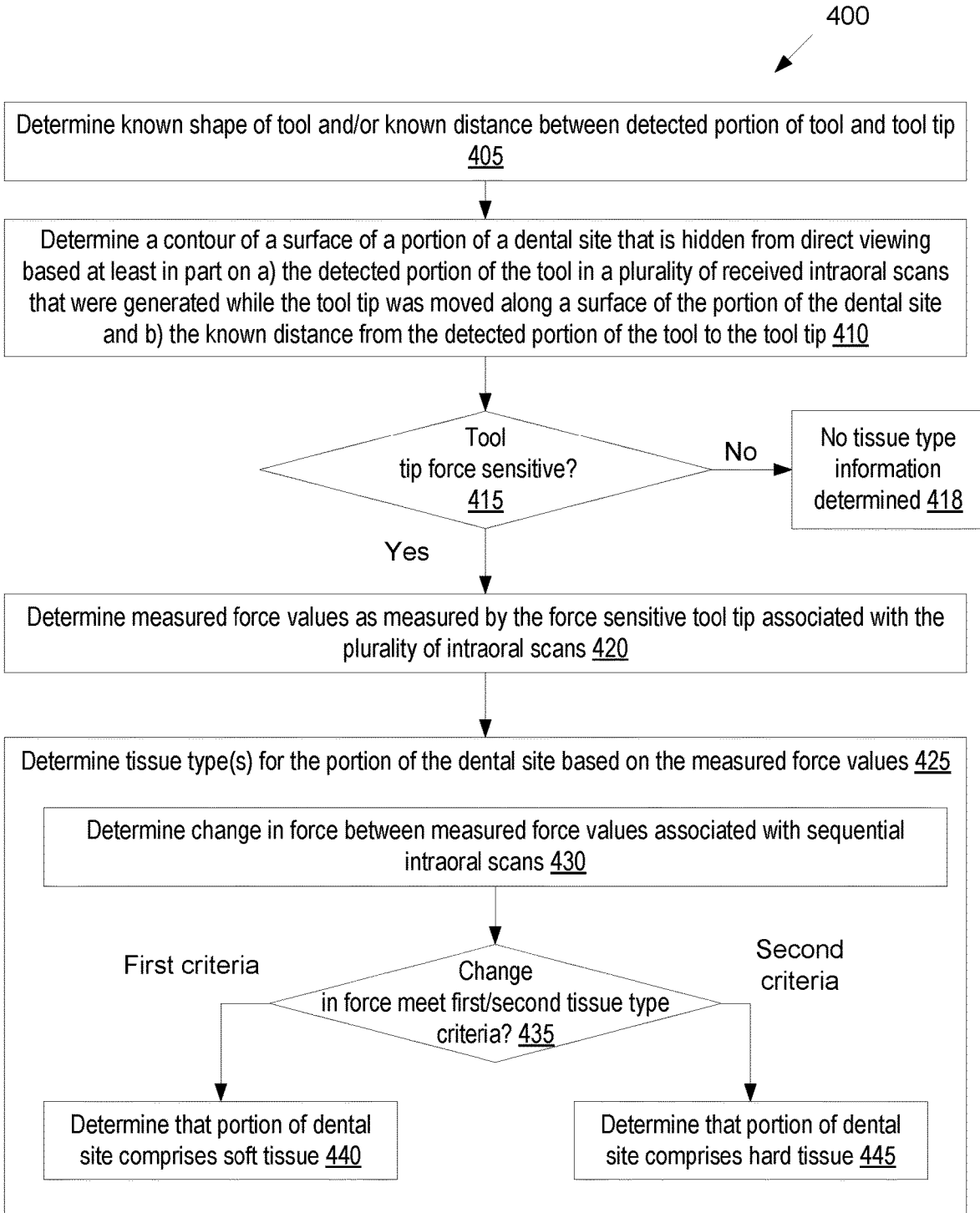

400

Determine known shape of tool and/or known distance between detected portion of tool and tool tip
405

Determine a contour of a surface of a portion of a dental site that is hidden from direct viewing based at least in part on a) the detected portion of the tool in a plurality of received intraoral scans that were generated while the tool tip was moved along a surface of the portion of the dental site and b) the known distance from the detected portion of the tool to the tool tip 410

Tool tip force sensitive? 415

No → No tissue type information determined 418

Yes

Determine measured force values as measured by the force sensitive tool tip associated with the plurality of intraoral scans 420

Determine tissue type(s) for the portion of the dental site based on the measured force values 425

Determine change in force between measured force values associated with sequential intraoral scans 430

First criteria    Change in force meet first/second tissue type criteria? 435    Second criteria Determine that portion of dental site comprises soft tissue 440

Determine that portion of dental site comprises hard tissue 445

FIG. 4A

Receive intraoral scan data of at least a first portion of a dental site, the intraoral scan data having been generated from one or more points of view of an intraoral scanner 455

Detect at least a portion of a tool in the intraoral scan data, wherein the tool comprises force sensitive tool tip having a known distance from the detected portion of the tool, wherein the intraoral scan data comprises a plurality of intraoral scans that were generated while the probe was moved along a surface of a second portion of the dental site 460

Generate a 3D surface of the dental site based on the received intraoral scan data 465

Determine a contour of the surface of the second portion of the dental site based at least in part on the detected portion of the tool in the plurality of intraoral scans and the known distance from the detected portion of the tool to the force sensitive tool tip 470

Determine a tissue type for the second portion of the dental site based on measured force values as measured by the force sensitive tool tip 475

Supplement the 3D surface of the dental site with at least one of the determined contour or the determined tissue type of the second portion of the dental site that is hidden from direct viewing by the intraoral scanner 480

FIG. 4B           450

600

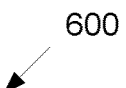

Determine a known shape of tool, a known volume of a probe of the tool and/or known distance between detected portion of tool and tool probe <u>605</u>

Determine a volume of space occupied by the probe across the a plurality of intraoral scans that were generated while the tool probe moved at a location of a portion of the dental site based at least in part on a) the detected portion of the tool, b) the known volume of the probe, and c) the known position of the probe relative to the detection portion of the tool <u>610</u>

Determine a surface of the portion of the dental site based at least in part on the volume of space occupied by the probe across the plurality of intraoral scans <u>615</u>

FIG. 6

Receive intraoral scan data of at least a first portion of a dental site, the intraoral scan data having been generated from one or more points of view of an intraoral scanner 705

↓

Detect at least a portion of a tool in the intraoral scan data, wherein the tool comprises a probe having a known volume and a known position relative to the detected portion of the tool, wherein the intraoral scan data comprises a plurality of intraoral scans that were generated while the probe was moved at a location of the first portion of the dental site  710

↓

Generate a 3D surface of the dental site based on the received intraoral scan data 715

↓

Determine a volume of space occupied by the probe across the plurality of intraoral scans based at least in part on the detected portion of the tool in the plurality of intraoral scans, the known volume of the probe, and the known position of the probe relative to the detected portion of the tool 720

↓

Determine a surface of a second portion of the dental site that is hidden from direct viewing by the intraoral scanner from the one or more points of view based at least in part on the volume of space occupied by the probe across the plurality of intraoral scans  725

↓

Supplement the 3D surface of the dental site with additional surface data of the determined surface of the second portion of the dental site  730

FIG. 7  700

Receive intraoral scan data of at least a first portion of a dental site, the intraoral scan data having been generated from one or more points of view of an intraoral scanner 905

Detect at least a portion of a tool in the intraoral scan data, wherein the tool comprises a reflective surface 910

Generate a 3D surface of the dental site based on the received intraoral scan data 915

Supplement the 3D surface of the dental site with additional surface data of a second portion of the dental site that is hidden from direct viewing by the intraoral scanner from the one or more points of view, wherein the additional surface data comprises a reflection of the second portion of the dental site off of the reflective surface 920

FIG. 9

 900

1000

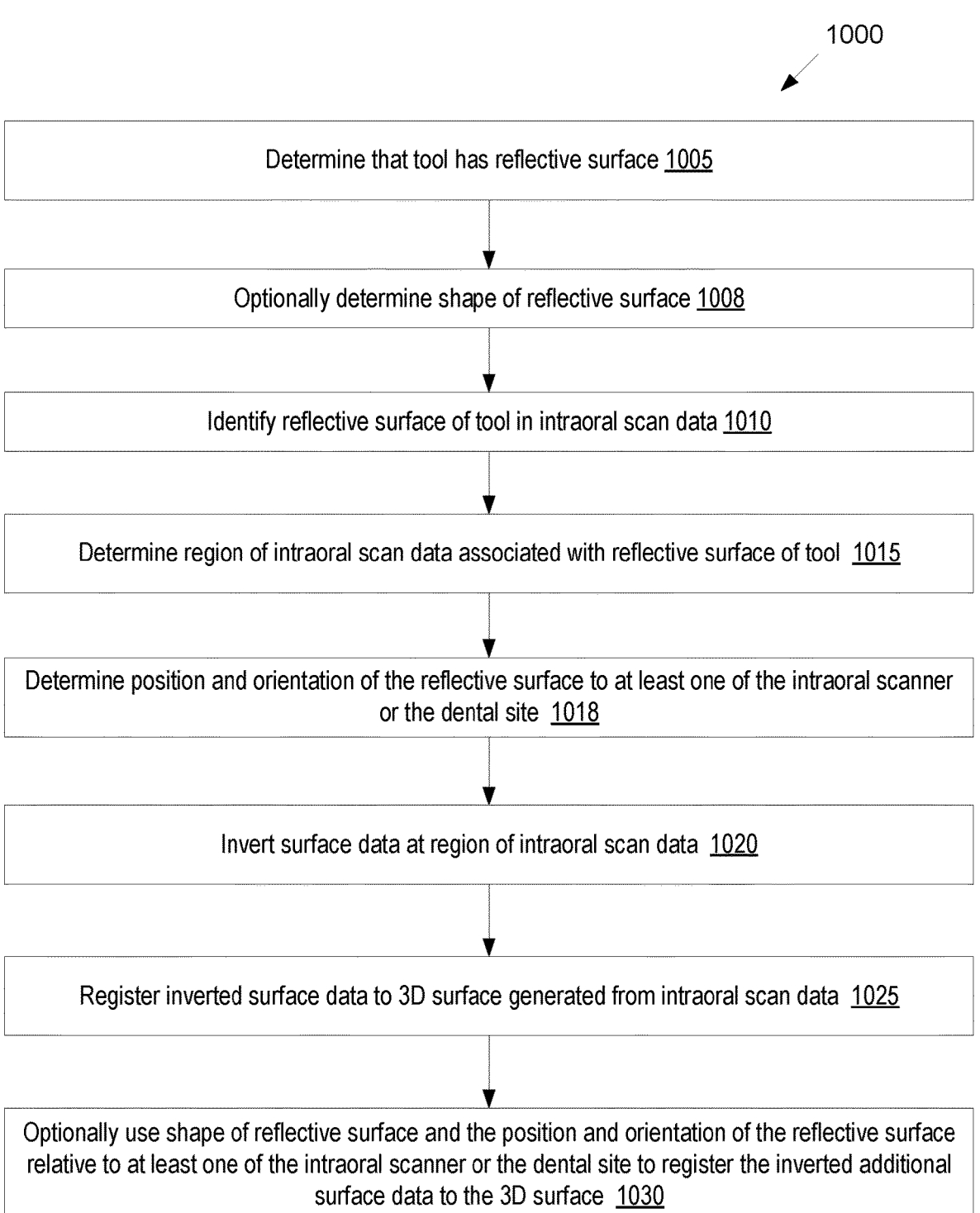

Determine that tool has reflective surface 1005

Optionally determine shape of reflective surface 1008

Identify reflective surface of tool in intraoral scan data 1010

Determine region of intraoral scan data associated with reflective surface of tool 1015

Determine position and orientation of the reflective surface to at least one of the intraoral scanner or the dental site 1018

Invert surface data at region of intraoral scan data 1020

Register inverted surface data to 3D surface generated from intraoral scan data 1025

Optionally use shape of reflective surface and the position and orientation of the reflective surface relative to at least one of the intraoral scanner or the dental site to register the inverted additional surface data to the 3D surface 1030

Receive intraoral scan data of at least a first portion of a dental site, the intraoral scan data having been generated from one or more points of view of an intraoral scanner 1210

Perform object recognition on the intraoral scan data to determine an identity of a tool in the intraoral scan data 1215

Use identity of the tool to determine a known tool shape 1220

Generate 3D surface of dental site based on received intraoral scan data 1225

Supplement the 3D surface of the dental site with additional surface data of a second portion of the dental site that is hidden from direct viewing by the intraoral scanner from the one or more points of view, wherein the additional surface data is based at least in part on the known shape of the tool 1230

Use known shape of tool to fill in missing details about at least one of the dental site or the tool that are not included in the intraoral scan data 1235

FIG. 12

Displacement

CAPTURE OF INTRAORAL FEATURES FROM NON-DIRECT VIEWS

RELATED APPLICATIONS

This application claims the benefit of U.S. Provisional Application No. 63/355,011, filed Jun. 23, 2022, the entire content of which is hereby incorporated by reference.

TECHNICAL FIELD

Embodiments of the present disclosure relate to the field of dentistry and, in particular, to the capture of intraoral features (e.g., dental features) for which an intraoral scanner lacks a direct view.

BACKGROUND

For both restorative and orthodontic dental work, it may be difficult to capture images of certain regions of dental sites. An intraoral scanner may not have a direct view of such regions, or a direct view that the intraoral scanner can achieve may present sub-optimal viewing angles. In such instances, the quality of three-dimensional (3D) models at the regions that are difficult to capture may be low. This can result in poorly fitting prosthodontics (e.g., a poorly fitted crown) in the case of restorative dental work or poorly planned treatment in the case of orthodontic dental work.

SUMMARY

In a first aspect of the disclosure, a method comprises: receiving, from an intraoral scanner, intraoral scan data of at least a first portion of a dental site, the intraoral scan data having been generated from one or more points of view of the intraoral scanner; detecting at least a portion of a tool (e.g., that may be separate from the intraoral scanner) in the intraoral scan data; generating a three-dimensional (3D) surface of the dental site based on the received intraoral scan data; and supplementing the 3D surface of the dental site with additional surface data of a second portion of the dental site that at least one of a) is hidden from direct viewing by the intraoral scanner or b) presents a sub-optimal viewing angle to the intraoral scanner from the one or more points of view, wherein the additional surface data is based at least in part on properties of the detected tool.

In a second aspect of the disclosure, a method comprises: receiving, from an intraoral scanner, intraoral scan data comprising a plurality of intraoral scans of at least a portion of an intraoral cavity, the intraoral scan data having been generated from one or more points of view of the intraoral scanner; detecting a plurality of positions of at least a portion of a tool in the received intraoral scan data, wherein a relative position between the tool and at least one of the dental site or the intraoral scanner changes across the plurality intraoral scans; generating a three-dimensional (3D) surface of the dental site based on the received intraoral scan data; and supplementing the 3D surface of the dental site with additional surface data of a second portion of the dental site that is hidden from direct viewing by the intraoral scanner from the one or more points of view, wherein the additional surface data is based at least in part on properties of the detected tool.

In a third aspect of the disclosure, a method comprises: receiving, from an intraoral scanner, intraoral scan data of at least a first portion of a dental site, the intraoral scan data having been generated from a point of view of the intraoral scanner; detecting at least a portion of a tool in the intraoral scan data, wherein the tool is free to move relative to the intraoral scanner and to the dental site; generating a three-dimensional (3D) surface of the dental site based on the received intraoral scan data; and supplementing the 3D surface of the dental site with additional surface data of a second portion of the dental site for which an angle of incidence between imaging rays of the intraoral scanner and a vector normal to a surface of the dental site exceeds an angle threshold, wherein the additional surface data is based at least in part on properties of the detected tool.

A fourth aspect of the disclosure may further extend any of the first through third aspects of the disclosure. In the fourth aspect of the disclosure, the method further comprises outputting a view of the 3D surface of the dental site to a display, wherein a representation of the detected tool is not output to the display.

A fifth aspect of the disclosure may further extend any of the first through fourth aspects of the disclosure. In the fifth aspect of the disclosure, the method further comprises: detecting a position and orientation of the detected tool relative to the dental site; and determining the additional surface data based on the properties of the detected tool and the position and orientation of the detected tool relative to the dental site.

A sixth aspect of the disclosure may further extend any of the first through fifth aspects of the disclosure. In the sixth aspect of the disclosure, the method further comprises: generating a 3D surface of the detected tool; displaying the 3D surface of the dental site; and displaying the 3D surface of the detected tool at the detected position and orientation relative to the dental site.

A seventh aspect of the disclosure may further extend the sixth aspect of the disclosure. In the seventh aspect of the disclosure, the 3D surface of the dental site is displayed using a first visualization and the 3D surface of the detected tool is displayed using a second visualization.

An eighth aspect of the disclosure may further extend the seventh aspect of the disclosure. In the eighth aspect of the disclosure, the second visualization comprises a greater level of transparency than the first visualization.

A ninth aspect of the disclosure may further extend any of the first through eighth aspects of the disclosure. In the ninth aspect of the disclosure, the method further comprises: performing object recognition on the intraoral scan data to determine an identity of the tool in the intraoral scan data; and using the identity of the tool to determine a known shape of the tool; wherein generating the 3D surface comprises using the known shape of the tool to fill in missing details about the tool that are not included in the intraoral scan data.

A tenth aspect of the disclosure may further extend the ninth aspect of the disclosure. In the tenth aspect of the disclosure, using the identity of the tool to determine the shape of the tool comprises using the identity of the tool as an index into a library to identify an entry in the library that comprises information for the tool.

An eleventh aspect of the disclosure may further extend any of the first through tenth aspects of the disclosure. In the eleventh aspect of the disclosure, the second portion of the dental site is obstructed from the one or more points of view by at least one of gingiva or a tooth.

A 12$^{th}$ aspect of the disclosure may further extend any of the first through eleventh aspects of the disclosure. In the 12$^{th}$ aspect of the disclosure, the tool comprises a tool tip having a known distance from the detected portion of the tool, wherein the intraoral scan data comprises a plurality of intraoral scans that were generated while the tool tip was moved along a surface of the second portion of the dental site, the method further comprising: determining a contour of the surface of the second portion of the dental site based at least in part on the detected portion of the tool in the plurality of intraoral scans and the known distance from the detected portion of the tool to the tool tip.

A 13$^{th}$ aspect of the disclosure may further extend the 12$^{th}$ aspect of the disclosure. In the 13$^{th}$ aspect of the disclosure, the tool tip is a force sensitive tool tip, the method further comprising: determining measured force values as measured by the force sensitive tool tip associated with the plurality of intraoral scans; and determining a tissue type for the second portion of the dental site based on the measured force values.

A 14$^{th}$ aspect of the disclosure may further extend the 13$^{th}$ aspect of the disclosure. In the 14$^{th}$ aspect of the disclosure, the method further comprises: determining a change in force between measured force values associated with sequential intraoral scans of the plurality of intraoral scans; determining that the tissue type for the second portion of the dental site is hard tissue responsive to determining that the change in force satisfies a first criterion; and determining that the tissue type for the second portion of the dental site is soft tissue responsive to determining that the change in force satisfies a second criterion.

A 15$^{th}$ aspect of the disclosure may further extend the 14$^{th}$ aspect of the disclosure. In the 15$^{th}$ aspect of the disclosure, the first criterion is satisfied responsive to a force change threshold being exceeded, and wherein the second criterion is satisfied responsive to the force change threshold not being exceeded.

A 16$^{th}$ aspect of the disclosure may further extend any of the 13$^{th}$ through 15$^{th}$ aspects of the disclosure. In the 16$^{th}$ aspect of the disclosure, a first part of the second portion is determined to be hard tissue and a second part of the second portion is determined to be soft tissue.

A 17$^{th}$ aspect of the disclosure may further extend any of the first through 16$^{th}$ aspects of the disclosure. In the 17$^{th}$ aspect of the disclosure, the tool comprises a probe having a known volume and a known position relative to the detected portion of the tool, wherein the intraoral scan data comprises a plurality of intraoral scans that were generated while the probe was moved at a location of the second portion of the dental site, the method further comprising: determining a volume of space occupied by the probe across the plurality of intraoral scans based at least in part on the detected portion of the tool in the plurality of intraoral scans and the known volume of the probe and the known position of the probe relative to the detected portion of the tool to the probe; and determining a surface of the second portion of the dental site based at least in part on the volume of space occupied by the probe across the plurality of intraoral scans.

An 18$^{th}$ aspect of the disclosure may further extend any of the first through 17$^{th}$ aspects of the disclosure. In the 18$^{th}$ aspect of the disclosure, the tool comprises a reflective surface, and wherein the additional surface data comprises a reflection of the second portion of the dental site off of the reflective surface.

A 19$^{th}$ aspect of the disclosure may further extend the 18$^{th}$ aspect of the disclosure. In the 19$^{th}$ aspect of the disclosure, the method further comprises: determining that the intraoral scan data comprises the additional surface data; inverting the additional surface data front to back; and registering the inverted additional surface data to the 3D surface. The reflective surface may be a planar or non-planar reflective surface.

A 20$^{th}$ aspect of the disclosure may further extend the 19$^{th}$ aspect of the disclosure. In the 20$^{th}$ aspect of the disclosure, the method further comprises: determining a shape of the reflective surface; optionally determining a position and orientation of the reflective surface relative to at least one of the intraoral scanner or the dental site; and using the shape of the reflective surface and optionally the position and orientation of the reflective surface relative to at least one of the intraoral scanner or the dental site to perform the registering. The reflective surface may be a non-planar reflective surface, and the method may further comprise using the shape of the non-planar reflective surface to determine how to invert the additional surface data and to adjust magnification values for one or more points of the additional surface data.

A 21$^{st}$ aspect of the disclosure may further extend any of the first through 20$^{th}$ aspects of the disclosure. In the 21$^{st}$ aspect of the disclosure, the tool comprises one or more known registration features that are used to determine a position and orientation of the tool relative to the dental site.

A 22$^{nd}$ aspect of the disclosure may further extend any of the first through 21$^{st}$ aspects of the disclosure. In the 22$^{nd}$ aspect of the disclosure, the method further comprises: determining a margin line at the second portion of the dental site based on the additional surface data.

A 23$^{rd}$ aspect of the disclosure may further extend any of the first through 22$^{nd}$ aspects of the disclosure. In the 23$^{rd}$ aspect of the disclosure, the tool comprises a spacer used to determine an interproximal spacing between adjacent teeth, the spacer having a known thickness, and wherein the second portion of the dental site comprises the interproximal spacing between the adjacent teeth.

A 24$^{th}$ aspect of the disclosure may further extend any of the first through 22$^{nd}$ aspects of the disclosure. In the 24$^{th}$ aspect of the disclosure, the tool comprises a pocket depth measurement tool, and wherein the second portion of the dental site comprises a pocket.

A 25$^{th}$ aspect of the disclosure may further extend any of the first through 24$^{th}$ aspects of the disclosure. In the 25$^{th}$ aspect of the disclosure, generating and supplementing of the 3D surface are performed while further intraoral scan data is being generated by the intraoral scanner.

A 26$^{th}$ aspect of the disclosure may further extend any of the first through 25$^{th}$ aspects of the disclosure. In the 26$^{th}$ aspect of the disclosure, the tool is free to move relative to the dental site and relative to the intraoral scanner.

A 27$^{th}$ aspect of the disclosure may further extend any of the first through 26$^{th}$ aspects of the disclosure. In the 27$^{th}$ aspect of the disclosure, the method further comprises: receiving prior intraoral scan data of at least the first portion of the dental site from the intraoral scanner, the prior intraoral scan data having been generated from the point of view of the intraoral scanner prior to the intraoral scan data; generating an initial 3D surface of the dental site using the prior intraoral scan data; determining that the 3D surface of the dental site lacks surface data for the second portion of the dental site; and recommending use of the tool to acquire the surface data for the second portion of the dental site.

A 28$^{th}$ aspect of the disclosure may further extend any of the first through 27$^{th}$ aspects of the disclosure. In the 28$^{th}$ aspect of the disclosure, a computer readable medium comprises instructions that, when executed by a processing device, cause the processing device to perform the method of any of the first through 27$^{th}$ aspects of the disclosure.

A 29$^{th}$ aspect of the disclosure may further extend any of the first through 27$^{th}$ aspects of the disclosure. In the 29$^{th}$ aspect of the disclosure, a system comprises the intraoral scanner that generates the intraoral scan data and a computing device that performs the method of any of the first through 27$^{th}$ aspects of the disclosure.

A 29.1 aspect of the disclosure may further extend any of the first through 27$^{th}$ aspects of the disclosure. In the 29.1 aspect of the disclosure, a system comprises the intraoral scanner and a computing device configured to implement the method of any of the first through 27$^{th}$ aspects of the disclosure.

A 29.2 aspect of the disclosure may further extend any of the first through 27$^{th}$ aspects of the disclosure. In the 29.1 aspect of the disclosure, a computer readable medium comprises instructions that, when executed by a processing device, cause the processing device to implement the method of any of the first through 27$^{th}$ aspects of the disclosure.

In a 30$^{th}$ aspect of the disclosure, a system comprises: an intraoral scanner; and a computing device operatively coupled to the intraoral scanner, the computing device to: receive an indication that a tool that provides supplemental surface data will be used during intraoral scanning or determine that the tool is being used during the intraoral scanning; and implement a supplemental surface data scanning mode in which a three-dimensional (3D) surface of a dental site that is generated from intraoral scan data is supplemented with additional surface data determined based at least in part on properties of the tool, wherein the additional surface data is for a first portion of the 3D surface that is hidden from direct viewing by the intraoral scanner during intraoral scanning.

A 31$^{st}$ aspect of the disclosure may further extend the 30$^{th}$ aspect of the disclosure. In the 31$^{st}$ aspect of the disclosure, the indication comprises a user input selecting the supplemental surface data scanning mode.

A 32$^{nd}$ aspect of the disclosure may further extend the 30$^{th}$ or 31$^{st}$ aspect of the disclosure. In the 32$^{nd}$ aspect of the disclosure, the computing device is further to: receive, from the intraoral scanner, first intraoral scan data of a dental site using a first scanning mode; determine that a first portion of the dental site is hidden from direct view in the first intraoral scan data; and recommend that second intraoral scan data of the dental site be generated using the supplemental surface data scanning mode.

A 33$^{rd}$ aspect of the disclosure may further extend any of the 30$^{th}$ through 32$^{nd}$ aspects of the disclosure. In the 33$^{rd}$ aspect of the disclosure, the computing device is further to: receive an identification of the tool that is to be used; determine known properties of the tool; and use the known properties of the tool to provide the additional surface data.

A 34$^{th}$ aspect of the disclosure may further extend any of the 30$^{th}$ through 33$^{rd}$ aspects of the disclosure. In the 34$^{th}$ aspect of the disclosure, the computing device is further to: receive, from the intraoral scanner, intraoral scan data of at least a second portion of the dental site, the intraoral scan data having been generated from one or more points of view of the intraoral scanner; detect at least a portion of the tool in the intraoral scan data; generate the 3D surface of the dental site based on the received intraoral scan data; and supplement the 3D surface of the dental site with additional surface data of the first portion of the dental site that is hidden from direct viewing by the intraoral scanner from the one or more points of view, wherein the additional surface data is based at least in part on properties of the detected tool.

A 35$^{th}$ aspect of the disclosure may further extend the 34$^{th}$ aspect of the disclosure. In the 35$^{th}$ aspect of the disclosure, the computing device is further to output a view of the 3D surface of the dental site to a display, wherein a representation of the detected tool is not output to the display.

A 36$^{th}$ aspect of the disclosure may further extend the 34$^{th}$ or 35$^{th}$ aspect of the disclosure. In the 36$^{th}$ aspect of the disclosure, the computing device is further to: detect a position and orientation of the detected tool relative to the dental site; and determine the additional surface data based on the properties of the detected tool and the position and orientation of the detected tool relative to the dental site.

A 37$^{th}$ aspect of the disclosure may further extend the 34$^{th}$ through 36$^{th}$ aspects of the disclosure. In the 37$^{th}$ aspect of the disclosure, the computing device is further to: generate a 3D surface of the detected tool; display the 3D surface of the dental site; and display the 3D surface of the detected tool at the detected position and orientation relative to the 3D surface of the dental site.

A 38$^{th}$ aspect of the disclosure may further extend the 37$^{th}$ aspect of the disclosure. In the 38$^{th}$ aspect of the disclosure, the 3D surface of the dental site is displayed using a first visualization and the 3D surface of the detected tool is displayed using a second visualization.

A 39$^{th}$ aspect of the disclosure may further extend the 38$^{th}$ aspect of the disclosure. In the 39$^{th}$ aspect of the disclosure, the second visualization comprises a greater level of transparency than the first visualization.

A 40$^{th}$ aspect of the disclosure may further extend any of the 34$^{th}$ through 39$^{th}$ aspects of the disclosure. In the 40$^{th}$ aspect of the disclosure, the computing device is further to: perform object recognition on the intraoral scan data to determine an identity of the tool in the intraoral scan data; and use the identity of the tool to determine a known shape of the tool; wherein generating the 3D surface comprises using the known shape of the tool to fill in missing details about the tool that are not included in the intraoral scan data.

A 41$^{st}$ aspect of the disclosure may further extend the 40$^{th}$ aspect of the disclosure. In the 41$^{st}$ aspect of the disclosure, using the identity of the tool to determine the known shape of the tool comprises using the identity of the tool as an index into a library to identify an entry in the library that comprises information for the tool.

A 42$^{nd}$ aspect of the disclosure may further extend any of the 34$^{th}$ through 41$^{st}$ aspects of the disclosure. In the 42$^{nd}$ aspect of the disclosure, the first portion of the dental site is obstructed from the one or more points of view by at least one of gingiva or a tooth.

A 43$^{rd}$ aspect of the disclosure may further extend any of the 34$^{th}$ through 42$^{nd}$ aspects of the disclosure. In the 43$^{rd}$ aspect of the disclosure, the tool comprises a tool tip having a known distance from the detected portion of the tool, wherein the intraoral scan data comprises a plurality of intraoral scans that were generated while the tool tip was moved along a surface of the first portion of the dental site, and wherein the computing device is further to: determine a contour of the surface of the first portion of the dental site based at least in part on the detected portion of the tool in the plurality of intraoral scans and the known distance from the detected portion of the tool to the tool tip.

A 44$^{th}$ aspect of the disclosure may further extend the 43$^{rd}$ aspect of the disclosure. In the 44$^{th}$ aspect of the disclosure, the tool tip is a force sensitive tool tip, and wherein the computing device is further to: determine measured force values as measured by the force sensitive tool tip associated with the plurality of intraoral scans; and determine a tissue type for the first portion of the dental site based on the measured force values.

A 45$^{th}$ aspect of the disclosure may further extend the 44$^{th}$ aspect of the disclosure. In the 45$^{th}$ aspect of the disclosure, the computing device is further to: determine a change in force between measured force values associated with sequential intraoral scans of the plurality of intraoral scans; determine that the tissue type for the first portion of the dental site is hard tissue responsive to determining that the change in force satisfies a first criterion; and determine that the tissue type for the first portion of the dental site is soft tissue responsive to determining that the change in force satisfies a second criterion.

A $46^{th}$ aspect of the disclosure may further extend $45^{th}$ aspect of the disclosure. In the $46^{th}$ aspect of the disclosure, the first criterion is satisfied responsive to a force change threshold being exceeded, and wherein the second criterion is satisfied responsive to the force change threshold not being exceeded.

A $47^{th}$ aspect of the disclosure may further extend any of the $45^{th}$ through $46^{th}$ aspects of the disclosure. In the $47^{th}$ aspect of the disclosure, a first part of the first portion is determined to be hard tissue and a second part of the first portion is determined to be soft tissue.

A $48^{th}$ aspect of the disclosure may further extend any of the $34^{th}$ through $47^{th}$ aspects of the disclosure. In the $48^{th}$ aspect of the disclosure, the tool comprises a probe having a known volume and a known position relative to the detected portion of the tool, wherein the intraoral scan data comprises a plurality of intraoral scans that were generated while the probe was moved at a location of the first portion of the dental site, and wherein the computing device is further to: determine a volume of space occupied by the probe across the plurality of intraoral scans based at least in part on the detected portion of the tool in the plurality of intraoral scans, the known volume of the probe, and the known position of the probe relative to the detected portion of the tool; and determine a surface of the first portion of the dental site based at least in part on the volume of space occupied by the probe across the plurality of intraoral scans.

A $49^{th}$ aspect of the disclosure may further extend any of the $34^{th}$ through $48^{th}$ aspects of the disclosure. In the $49^{th}$ aspect of the disclosure, generating the 3D surface and supplementing the 3D surface are performed while further intraoral scan data is generated by the intraoral scanner.

A $50^{th}$ aspect of the disclosure may further extend any of the $30^{th}$ through $49^{th}$ aspects of the disclosure. In the $50^{th}$ aspect of the disclosure, the tool comprises a reflective surface, and wherein the additional surface data comprises a reflection of the first portion of the dental site off of the reflective surface.

A $51^{st}$ aspect of the disclosure may further extend the $50^{th}$ aspect of the disclosure. In the $51^{st}$ aspect of the disclosure, the computing device is further to: determine that the intraoral scan data comprises the additional surface data; invert the additional surface data; and register the inverted additional surface data to the 3D surface.

A $52^{nd}$ aspect of the disclosure may further extend the $51^{st}$ aspect of the disclosure. In the $52^{nd}$ aspect of the disclosure, the computing device is further to: determine a shape of the reflective surface; determine a position and orientation of the reflective surface relative to at least one of the intraoral scanner or the dental site; and use the shape of the reflective surface and the position and orientation of the reflective surface relative to at least one of the intraoral scanner or the dental site to register the inverted additional surface data to the 3D surface.

A $53^{rd}$ aspect of the disclosure may further extend any of the $30^{th}$ through $52^{nd}$ aspects of the disclosure. In the $53^{rd}$ aspect of the disclosure, the tool comprises one or more known registration features that are used to determine a position and orientation of the tool relative to the dental site.

A $54^{th}$ aspect of the disclosure may further extend any of the $30^{th}$ through $53^{rd}$ aspects of the disclosure. In the $54^{th}$ aspect of the disclosure, the computing device is further to determine a margin line at the first portion of the dental site based on the additional surface data.

A $55^{th}$ aspect of the disclosure may further extend any of the $30^{th}$ through $54^{th}$ aspects of the disclosure. In the $55^{th}$ aspect of the disclosure, the tool comprises a spacer used to determine an interproximal spacing between adjacent teeth, the spacer having a known thickness, and wherein the first portion of the dental site comprises the interproximal spacing between the adjacent teeth.

A $56^{th}$ aspect of the disclosure may further extend any of the $30^{th}$ through $55^{th}$ aspects of the disclosure. In the $56^{th}$ aspect of the disclosure, the tool comprises a pocket depth measurement tool, and wherein the first portion of the dental site comprises a pocket.

A $57^{th}$ aspect of the disclosure may further extend any of the $30^{th}$ through $56^{th}$ aspects of the disclosure. In the $57^{th}$ aspect of the disclosure, the tool is free to move relative to the dental site and relative to the intraoral scanner.

A $58^{th}$ aspect of the disclosure may further extend any of the $30^{th}$ through $57^{th}$ aspects of the disclosure. In the $58^{th}$ aspect of the disclosure, the computing device is further to: receive prior intraoral scan data of at least a second portion of the dental site from the intraoral scanner, the prior intraoral scan data having been generated from a point of view of the intraoral scanner; generate an initial 3D surface of the dental site using the prior intraoral scan data; determine that the initial 3D surface of the dental site lacks surface data for the first portion of the dental site; and recommend use of the tool to acquire the surface data for the first portion of the dental site.

In a $59^{th}$ aspect of the disclose, a system comprises: an intraoral scanner; and a computing device, wherein the computing device is to: receive, from the intraoral scanner, intraoral scan data comprising a plurality of intraoral scans of at least a first portion of a dental site, the intraoral scan data having been generated from one or more points of view of the intraoral scanner; detect a plurality of positions of at least a portion of a tool in the received intraoral scan data, wherein a relative position between the tool and at least one of the dental site or the intraoral scanner changes across the plurality intraoral scans; generate a three-dimensional (3D) surface of the dental site based on the received intraoral scan data; and supplement the 3D surface of the dental site with additional surface data of a second portion of the dental site for which an angle of incidence between imaging rays of the intraoral scanner and a vector normal to a surface of the dental site exceeds an angle threshold, wherein the additional surface data is based at least in part on properties of the detected tool.

In a $60^{th}$ aspect of the disclose, a system comprises: an intraoral scanner; and a computing device, wherein the computing device is to: receive, from the intraoral scanner, intraoral scan data of at least a first portion of a dental site, the intraoral scan data having been generated from a point of view of the intraoral scanner; detect at least a portion of a tool in the intraoral scan data, wherein the tool is free to move relative to the intraoral scanner and to the dental site; generate a three-dimensional (3D) surface of the dental site based on the received intraoral scan data; and supplement the 3D surface of the dental site with additional surface data of a second portion of the dental site for which an angle of incidence between imaging rays of the intraoral scanner and a vector normal to a surface of the dental site exceeds an angle threshold, wherein the additional surface data is based at least in part on properties of the detected tool.

In a 61$^{st}$ aspect of the disclose, a system comprises: an intraoral scanner; and a computing device, wherein the computing device is to: receive, from the intraoral scanner, intraoral scan data of at least a first portion of a dental site, the intraoral scan data having been generated from one or more points of view of the intraoral scanner; perform object recognition on the intraoral scan data to determine an identity of a tool in the intraoral scan data; use the identity of the tool to determine a known shape of the tool; generate a three-dimensional (3D) surface of the dental site based on the received intraoral scan data; and supplement the 3D surface of the dental site with additional surface data of a second portion of the dental site that is hidden from direct viewing by the intraoral scanner from the one or more points of view, wherein the additional surface data is based at least in part on the known shape of the tool.

A 62$^{nd}$ aspect of the disclosure may further extend the 61$^{st}$ aspect of the disclosure, In the 62$^{nd}$ aspect of the disclosure, to supplement the 3D surface of the dental site the computing device uses the known shape of the tool to fill in missing details about at least one of the dental site or the tool that are not included in the intraoral scan data.

A 63$^{rd}$ aspect of the disclosure may further extend the 62$^{nd}$ aspect of the disclosure, In the 63$^{rd}$ aspect of the disclosure, to perform the object recognition the computing device is to input information from the intraoral scan data into a trained machine learning model that has been trained to identify one or more types of tools used in dentistry, wherein the trained machine learning model generates an output identifying the tool.

In a 64$^{th}$ aspect of the disclosure, a system comprises: an intraoral scanner; and a computing device operatively coupled to the intraoral scanner, the computing device to: receive, from the intraoral scanner, first intraoral scan data of a dental site; determine that a first portion of the dental site is hidden from direct view in the first intraoral scan data; and recommend that second intraoral scan data of the dental site be generated and that a tool that provides supplemental surface data be used to provide supplemental surface data for the first portion of the dental site during generation of the second intraoral scan data.

A 65$^{th}$ aspect of the disclosure may further extend the 64$^{th}$ aspect of the disclosure. In the 65$^{th}$ aspect of the disclosure, the computing device is further to: receive second intraoral scan data of at least a second portion of the dental site, the intraoral scan data having been generated from one or more points of view of the intraoral scanner; detect at least a portion of the tool in the second intraoral scan data; generate a three-dimensional (3D) surface of the dental site based on at least one of the received first intraoral scan data or the received second intraoral scan data; and supplement the 3D surface of the dental site with additional surface data of the first portion of the dental site that is hidden from direct viewing by the intraoral scanner from the one or more points of view, wherein the additional surface data is based at least in part on properties of the detected tool.

In a 66$^{th}$ aspect of the disclosure, a system comprises: an intraoral scanner; and a computing device operatively coupled to the intraoral scanner, the computing device to: receive, from the intraoral scanner, intraoral scan data of at least a first portion of a dental site, the intraoral scan data having been generated from one or more points of view of the intraoral scanner; detect at least a portion of a tool in the intraoral scan data, wherein the tool comprises a probe having a known volume and a known position relative to the detected portion of the tool, wherein the intraoral scan data comprises a plurality of intraoral scans that were generated while the probe was moved at a location of the first portion of the dental site; generate a three-dimensional (3D) surface of the dental site based on the received intraoral scan data; determine a volume of space occupied by the probe across the plurality of intraoral scans based at least in part on the detected portion of the tool in the plurality of intraoral scans, the known volume of the probe, and the known position of the probe relative to the detected portion of the tool; determine a surface of a second portion of the dental site that is hidden from direct viewing by the intraoral scanner from the one or more points of view based at least in part on the volume of space occupied by the probe across the plurality of intraoral scans; and supplement the 3D surface of the dental site with additional surface data of the determined surface of the second portion of the dental site.

A 67$^{th}$ aspect of the disclosure may further extend the 66$^{th}$ aspect of the disclosure. In the 67$^{th}$ aspect of the disclosure, the tool comprises a spacer used to determine an interproximal spacing between adjacent teeth, the spacer having a known thickness, and wherein the second portion of the dental site comprises the interproximal spacing between the adjacent teeth.

A 68$^{th}$ aspect of the disclosure may further extend the 66$^{th}$ or 67$^{th}$ aspect of the disclosure. In the 68$^{th}$ aspect of the disclosure, the tool comprises a pocket depth measurement tool, and wherein the second portion of the dental site comprises a pocket.

In a 69$^{th}$ aspect of the disclosure, a system comprises: an intraoral scanner; and a computing device operatively coupled to the intraoral scanner, the computing device to: receive, from the intraoral scanner, intraoral scan data of at least a first portion of a dental site, the intraoral scan data having been generated from one or more points of view of the intraoral scanner; detect at least a portion of a tool in the intraoral scan data, wherein the tool comprises a reflective surface; generate a three-dimensional (3D) surface of the dental site based on the received intraoral scan data; and supplement the 3D surface of the dental site with additional surface data of a second portion of the dental site that is hidden from direct viewing by the intraoral scanner from the one or more points of view, wherein the additional surface data comprises a reflection of the second portion of the dental site off of the reflective surface.

A 70$^{th}$ aspect of the disclosure may further extend the 69$^{th}$ aspect of the disclosure. In the 70$^{th}$ aspect of the disclosure, the computing device is further to: determine that the intraoral scan data comprises the additional surface data; invert the additional surface data; and register the inverted additional surface data to the 3D surface.

A 71$^{st}$ aspect of the disclosure may further extend the 70$^{th}$ aspect of the disclosure. In the 71$^{st}$ aspect of the disclosure, the computing device is further to: determine a shape of the reflective surface; determine a position and orientation of the reflective surface relative to at least one of the intraoral scanner or the dental site; and use the shape of the reflective surface and the position and orientation of the reflective surface relative to at least one of the intraoral scanner or the dental site to register the inverted additional surface data to the 3D surface.

In a 72$^{nd}$ aspect of the disclosure, a system comprises: an intraoral scanner; and a computing device operatively coupled to the intraoral scanner, the computing device to: receive, from the intraoral scanner, intraoral scan data of at least a first portion of a dental site, the intraoral scan data having been generated from one or more points of view of the intraoral scanner; detect at least a portion of a tool in the intraoral scan data, wherein the tool comprises a force sensitive tool tip having a known distance from the detected portion of the tool, wherein the intraoral scan data comprises a plurality of intraoral scans that were generated while the force sensitive tool tip was moved along a surface of a second portion of the dental site; generate a three-dimensional (3D) surface of the dental site based on the received intraoral scan data; and determine a contour of the surface of the second portion of the dental site based at least in part on the detected portion of the tool in the plurality of intraoral scans and the known distance from the detected portion of the tool to the force sensitive tool tip; determine a tissue type for the second portion of the dental site based on measured force values as measured by the force sensitive tool tip; and supplement the 3D surface of the dental site with at least one of the determined contour or the determined tissue type of the second portion of the dental site that is hidden from direct viewing by the intraoral scanner.

A $73^{rd}$ aspect of the disclosure may further extend the $72^{nd}$ aspect of the disclosure. In the $73^{rd}$ aspect of the disclosure, the computing device is further to: determine a change in force between measured force values associated with sequential intraoral scans of the plurality of intraoral scans; determine that the tissue type for the second portion of the dental site is hard tissue responsive to determining that the change in force satisfies a first criterion; and determine that the tissue type for the second portion of the dental site is soft tissue responsive to determining that the change in force satisfies a second criterion.

A $74^{th}$ aspect of the disclosure may further extend the $73^{rd}$ aspect of the disclosure. In the $74^{th}$ aspect of the disclosure, the first criterion is satisfied responsive to a force change threshold being exceeded, and wherein the second criterion is satisfied responsive to the force change threshold not being exceeded.

A $75^{th}$ aspect of the disclosure may further extend any of the $72^{nd}$ through $74^{th}$ aspects of the disclosure. In the $74^{th}$ aspect of the disclosure, a first part of the second portion is determined to be hard tissue and a second part of the second portion is determined to be soft tissue.

BRIEF DESCRIPTION OF THE DRAWINGS

Embodiments of the present disclosure are illustrated by way of example, and not by way of limitation, in the figures of the accompanying drawings.

FIG. 2A illustrates a flow diagram for a method of implementing a supplemental surface data scanning mode, in accordance with an embodiment.

FIG. 2B illustrates a flow diagram for a method of implementing a supplemental surface data scanning mode, in accordance with an embodiment.

FIG. 2C illustrates a flow diagram for a method of recommending use of a supplemental surface data scanning mode, in accordance with an embodiment.

FIG. 3 illustrates a flow diagram for a method of supplementing a 3D surface of a dental site based on properties of a detected tool, in accordance with an embodiment.

FIG. 4A illustrates a flow diagram for a method of supplementing a 3D surface of a dental site based on properties of a detected tool with a force sensitive tip, in accordance with an embodiment.

FIG. 4B illustrates a flow diagram for a method of supplementing a 3D surface of a dental site based on properties of a detected tool with a force sensitive tip, in accordance with an embodiment.

FIG. 6 illustrates a flow diagram for a method of supplementing a 3D surface of a dental site based on a volume of space carved out by a tool during scanning, in accordance with an embodiment.

FIG. 7 illustrates a flow diagram for a method of supplementing a 3D surface of a dental site based on a volume of space carved out by a tool during scanning, in accordance with an embodiment.

FIG. 9 illustrates a method of supplementing a 3D surface of a dental site based on properties of a reflective tool, in accordance with an embodiment.

FIG. 10 illustrates a method of supplementing a 3D surface of a dental site based on properties of a reflective tool, in accordance with an embodiment.

FIG. 12 illustrates a flow diagram for a method of identifying a tool in intraoral scan data and supplementing a 3D surface based on properties of the tool, in accordance with an embodiment.

DETAILED DESCRIPTION

Figure 1:
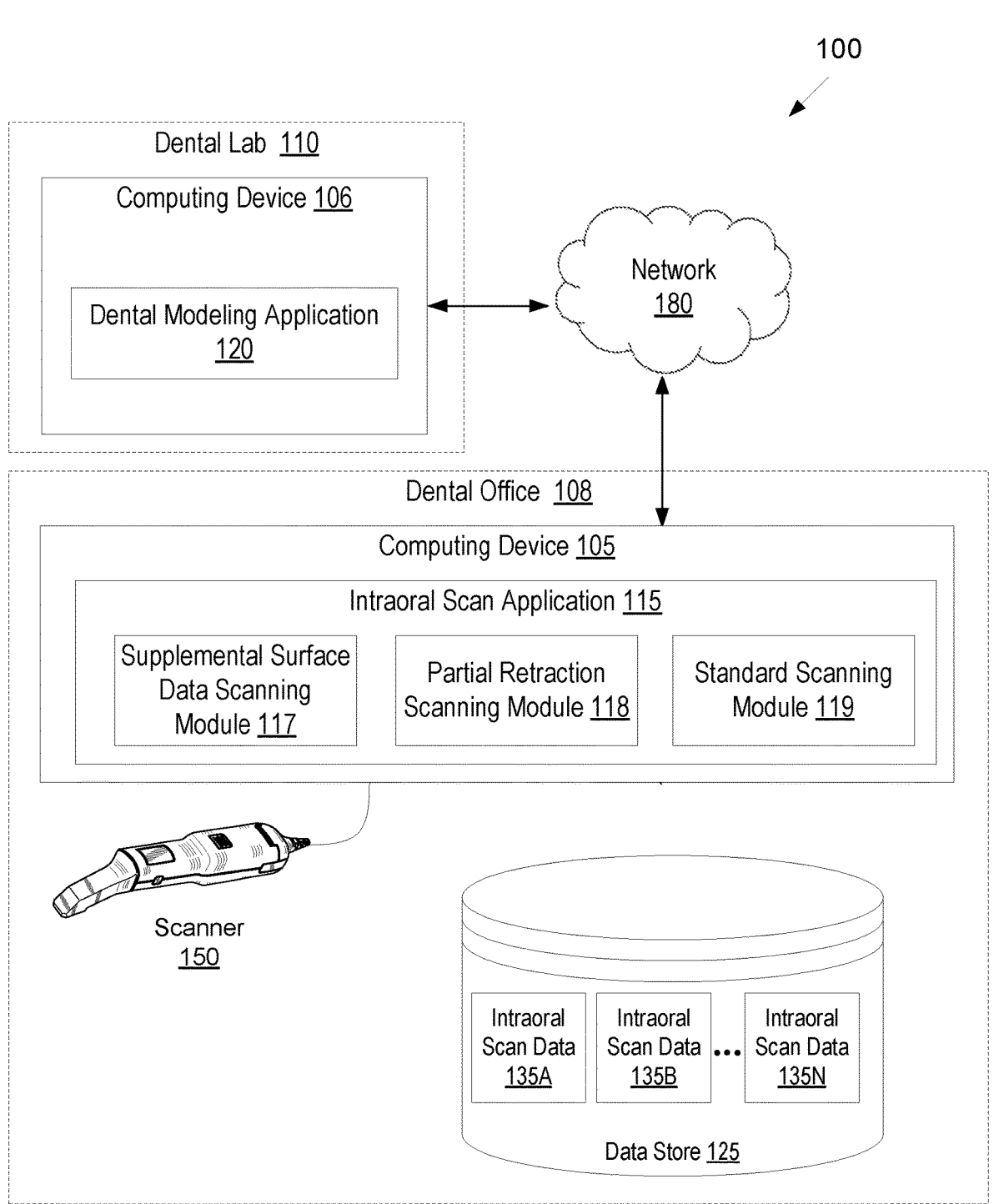
FIG. 1 illustrates one embodiment of a system for performing intraoral scanning and/or generating a virtual three-dimensional model of an intraoral site.

Described herein are methods and systems for intraoral scanning, and in particular for capturing all of the surface of a dental site during intraoral scanning in spite of one or more portions of the surface being hidden from direct viewing by an intraoral scanner. The methods and systems described herein can capture, for example, sub-gingival portions of a tooth (e.g., sub-gingival portions of a preparation tooth, such as a sub-gingival margin line), regions of a back molar that are unreachable by an intraoral scanner, gingival pockets, interproximal regions between teeth, concave regions in teeth, deep regions of teeth, and so on, all of which may be occluded from view by teeth, gingiva and/or other obstacles. The methods and systems use supplemental data provided by one or more dental tools (or simply tools for short) to determine surfaces of a dental site that are otherwise difficult to capture using an intraoral scanner alone. The tool may be captured in intraoral scans along with tooth structures. The tool may have a known geometry (e.g., shape, length, width, etc.). The tool may be separate from an intraoral scanner (e.g., mechanically independent from the intraoral scanner), and may move freely (e.g., be free to move) relative to the intraoral scanner and relative to a dental site during scanning. The tool may be inserted into an oral cavity at a same time as the intraoral scanner. The position of the tool relative to the tooth structures in the intraoral scans may be used together with the known information about the tool (e.g., about the tool's geometry) used to determine supplemental information about the dental site (e.g., about a tooth). In some embodiments, the tool carves out a volume of space, and processing logic determines supplemental surface data for a dental site based on the volume of space carved out by the tool. In some embodiments, the tool includes a force sensitive tip, and tissue type may be determined for one or more regions of the dental site based on force measurements made by the force sensitive tip. In some embodiments, the tool includes a reflective surface, and the scanner captures a reflection of a portion of a dental site off of the reflective surface. The reflection may be used to fill in surface data about a portion of a dental surface that is not directly viewable (e.g., not in a direct line of sight) of the intraoral scanner. Accordingly, the tool may be used to mechanically mark an empty region of space (e.g., via space carving with the tool while performing intraoral scanning), mechanically mark the edge of regions of a dental site (e.g., by performing scanning while following a contour of the dental site with a tip of the tool), redirect a view of a scanner using a mirror or other reflective surface, and so on.

In embodiments, three-dimensional models or surfaces (e.g., virtual 3D models or surfaces) of dental sites may be generated based on intraoral scan data. The 3D models or surfaces of the dental site may have one or more regions that are low quality or that have voids due to those regions being hidden from or inaccessible by an intraoral scanner. The 3D models or surfaces of the dental site may be supplemented with additional surface data of the regions or portions of the dental site that are hidden from direct viewing by the intraoral scanner, wherein the additional surface data is based at least in part on properties of a detected tool that is used during the intraoral scanning and depicted in at least some of the intraoral scans. In embodiments, processing logic detects at least a portion of the tool in the intraoral scan data, and uses the relative position and orientation of the detected tool relative to the dental site and known information about the tool to determine the supplemental surface data for the 3D surface or 3D model of the dental site.

Embodiments improve the accuracy of 3D surfaces and 3D models generated from intraoral scanning by adding additional surface data that would otherwise be unobtainable or be of low quality due to poor capture angles. For example, portions of a dental site for which an angle of incidence between imaging rays of the intraoral scanner and a vector normal to a surface of the dental site exceeds an angle threshold may have low imaging accuracy. Accordingly, for such portions of a dental site supplemental data from the tool may improve a quality of the surface data, and thus a quality of a 3D surface or 3D model generated based on the intraoral scans.

For many prosthodontic procedures (e.g., to create a crown, bridge, veneer, etc.), an existing tooth of a patient is ground down to a stump. The ground tooth is referred to herein as a preparation tooth, or simply a preparation. The preparation tooth has a margin line (also referred to as a margin line), which is a border between a natural (unground)

portion of the preparation tooth and the prepared (ground) portion of the preparation tooth. The preparation tooth is typically created so that a crown or other prosthesis can be mounted or seated on the preparation tooth. In many instances, the margin line of the preparation tooth is sub-gingival (below the gum line). While the term preparation typically refers to the stump of a preparation tooth, including the margin line and shoulder that remains of the tooth, the term preparation herein also includes artificial stumps, pivots, cores and posts, or other devices that may be implanted in the intraoral cavity so as to receive a crown or other prosthesis. Embodiments described herein with reference to a preparation tooth also apply to other types of preparations, such as the aforementioned artificial stumps, pivots, and so on.

After the preparation tooth is created, a practitioner performs operations to ready that preparation tooth for scanning. Readying the preparation tooth for scanning may include wiping blood, saliva, etc. off of the preparation tooth and/or separating a patient's gum from the preparation tooth to expose the margin line. In some instances, a practitioner will insert a material (e.g., a retraction material such as a retraction cord) around the preparation tooth between the preparation tooth and the patient's gum. The practitioner will then remove the cord before generating a set of intraoral scans of the preparation tooth. The soft tissue of the gum will then revert back to its natural position, and in many cases collapses back over the margin line, after a brief time period. Accordingly, the practitioner uses an intraoral scanner to scan the readied preparation tooth and generate a set of intraoral images of the preparation tooth before the soft tissue reverts back to its natural position. The intraoral scanner may be used in a first scanning mode, referred to as a standard scanning mode, for this process. In some embodiments, the margin line of the preparation tooth is exposed, or mostly exposed, and the margin line is scanned using the standard scanning mode without the practitioner having taken any steps to expose the margin line.

In one embodiment, the intraoral scanner is used in a second scanning mode, referred to as a partial retraction scanning mode. For the second scanning mode, a practitioner (e.g., a dentist or doctor) uses a tool such as a dental probe, a dental spatula, a triple syringe, a tool to output a stream of air or water, etc. to partially expose the margin line around a preparation tooth being scanned. While a portion of the margin line is exposed, the intraoral scanner generates a scan of the region of the preparation tooth with the exposed portion of the margin line. The practitioner then uses the tool to expose another portion of the margin line, which is also imaged. This process continues until all of the margin line has been exposed and scanned. Different algorithms, settings, rules and criteria may be used for stitching images together for the standard scanning mode and for the partial retraction scanning mode. The partial retraction scanning technique may be a more efficient technique for scanning sub-gingival preparations than standard techniques such as use of a retraction cord. The partial retraction scanning technique may be performed more quickly (e.g., on the order of 1-2 minutes, or even less than a minute) and with minimal patient discomfort. Additionally, the practitioner can perform the partial retraction scanning technique without needing to rush to avoid the gingiva collapsing back over the margin line.

In some embodiments, the standard preparation (full retraction) scanning mode or the partial retraction scanning mode may be supplemented by enabling a supplemental surface data scanning mode. The supplemental surface data scanning mode may add further intelligence (e.g., trained machine learning models, algorithms, etc.) for detecting and/or recognizing particular types of tools and then determining additional surface data based at least in part on known properties of the detected tool. The supplemental surface data scanning mode may additionally be enabled for intraoral scanning performed for orthodontic procedures in addition to intraoral scanning performed for prosthodontic procedures. For such embodiments, the supplemental surface data scanning mode may be used to add surface data for portions of a dental site that might be hidden from direct view by an intraoral scanner, such as interproximal regions between adjacent teeth, regions of back molars, and so on.

With regards to prosthodontic procedures, the intraoral site at which a prosthesis is to be implanted generally should be measured accurately and studied carefully, so that the prosthesis such as a crown, denture or bridge, for example, can be properly designed and dimensioned to fit in place. A good fit enables mechanical stresses to be properly transmitted between the prosthesis and the jaw, and can prevent infection of the gums and tooth decay via the interface between the prosthesis and the intraoral site, for example. After the intraoral site has been scanned, a virtual 3D model (also referred to herein simply as a 3D model) of the dental site may be generated, and that 3D model may be used to manufacture a dental prosthetic. However, if the area of a preparation tooth containing the margin line lacks definition, it may not be possible to properly determine the margin line, and thus the margin of a restoration may not be properly designed. Similarly, if a 3D model generated for orthodontic procedures is unclear or inaccurate, then designed aligners may not properly fit onto a patient's dental arch at a stage of orthodontic treatment.

Accordingly, embodiments disclosed herein provide automated systems and methods for supplementing the surface data of 3D surfaces and 3D models generated from intraoral scans using additional data determined based on a tool used during scanning and included in one or more intraoral scans.

Various embodiments are described herein. It should be understood that these various embodiments may be implemented as stand-alone solutions and/or may be combined. Accordingly, references to an embodiment, or one embodiment, may refer to the same embodiment and/or to different embodiments. Additionally, some embodiments are discussed with reference to restorative dentistry, and in particular to preparation teeth and margin lines. However, it should be understood that embodiments discussed with reference to restorative dentistry (e.g., prosthodontics) may also apply to corrective dentistry (e.g., orthodontia). Additionally, embodiments discussed with reference to preparation teeth may also apply to teeth generally, and not just preparation teeth. Furthermore, embodiments discussed with reference to margin lines may also apply to other dental features, such as cracks, chips, gum lines, caries, and so on. For example, embodiments discussed herein that can identify and correct margin lines can also identify and remove blood and/or saliva on a tooth surface, foreign objects that obscure a tooth surface, poor data capture caused by reflections, captured areas with low clarity, and so on.

Some embodiments are discussed herein with reference to intraoral scans and intraoral images. However, it should be understood that embodiments described with reference to intraoral scans also apply to lab scans or model/impression scans. A lab scan or model/impression scan may include one or more images of a dental site or of a model or impression of a dental site, which may or may not include height maps, and which may or may not include color images. In embodiments a machine learning model may be trained to identify a margin line from images of a lab scan of model/impression scan, for example.

FIG. 1 illustrates one embodiment of a system 100 for performing intraoral scanning and/or generating a virtual three-dimensional model of an intraoral site. In one embodiment, one or more components of system 100 carries out one or more operations described below with reference to FIGS. 2A-17.

System 100 includes a dental office 108 and a dental lab 110. The dental office 108 and the dental lab 110 each include a computing device 105, 106, where the computing devices 105, 106 may be connected to one another via a network 180. The network 180 may be a local area network (LAN), a public wide area network (WAN) (e.g., the Internet), a private WAN (e.g., an intranet), or a combination thereof.

Computing device 105 may be coupled to an intraoral scanner 150 (also referred to as a scanner) and/or a data store 125. Computing device 106 may also be connected to a data store (not shown). The data stores may be local data stores and/or remote data stores. Computing device 105 and computing device 106 may each include one or more processing devices, memory, secondary storage, one or more input devices (e.g., such as a keyboard, mouse, tablet, and so on), one or more output devices (e.g., a display, a printer, etc.), and/or other hardware components.

Intraoral scanner 150 may include a probe (e.g., a hand held probe) for optically capturing three-dimensional structures. The intraoral scanner 150 may be used to perform an intraoral scan of a patient's oral cavity. An intraoral scan application 115 running on computing device 105 may communicate with the scanner 150 to effectuate the intraoral scan. A result of the intraoral scan may be intraoral scan data 135A, 135B through 135N that may include one or more sets of intraoral scans. Each intraoral scan (also referred to as an intraoral image) may be a two-dimensional (2D) or 3D point cloud or image that includes depth information of a portion of a dental site, and may include x, y and z information. In one embodiment, the intraoral scanner 150 generates numerous discrete (i.e., individual) intraoral cans. Sets of discrete intraoral scans may be merged into a smaller set of blended intraoral scans, where each blended scan is a combination of multiple discrete scans or images. The scanner 150 may transmit the intraoral scan data 135A, 135B through 135N to the computing device 105. Computing device 105 may store the intraoral scan data 135A-135N in data store 125.

According to an example, a user (e.g., a practitioner) may subject a patient to intraoral scanning. In doing so, the user may apply scanner 150 to one or more patient intraoral locations. The scanning may be divided into one or more segments. As an example, the segments may include a lower buccal region of the patient, a lower lingual region of the patient, an upper buccal region of the patient, an upper lingual region of the patient, one or more preparation teeth of the patient (e.g., teeth of the patient to which a dental device such as a crown or other dental prosthetic will be applied), one or more teeth which are contacts of preparation teeth (e.g., teeth not themselves subject to a dental device but which are located next to one or more such teeth or which interface with one or more such teeth upon mouth closure), and/or patient bite (e.g., scanning performed with closure of the patient's mouth with the scan being directed towards an interface area of the patient's upper and lower teeth). Via such scanner application, the scanner 150 may provide intraoral scan data 135A-N to computing device 105. The intraoral scan data 135A-N may be provided in the form of intraoral scan or image data sets, each of which may include 2D intraoral images and/or 3D intraoral scans of particular teeth and/or regions of an intraoral site. In one embodiment, separate data sets are created for the maxillary arch, for the mandibular arch, for a patient bite, and for each preparation tooth. Alternatively, a single large intraoral data set is generated (e.g., for a mandibular and/or maxillary arch). Such scans may be provided from the scanner to the computing device 105 in the form of one or more points (e.g., one or more pixels and/or groups of pixels). For instance, the scanner 150 may provide such a 3D scan as one or more point clouds.

The manner in which the oral cavity of a patient is to be scanned may depend on the procedure to be applied thereto. For example, if an upper or lower denture is to be created, then a full scan of the mandibular or maxillary edentulous arches may be performed. In contrast, if a bridge is to be created, then just a portion of a total arch may be scanned which includes an edentulous region, the neighboring preparation teeth (e.g., abutment teeth) and the opposing arch and dentition. Additionally, the manner in which the oral cavity is to be scanned may depend on a doctor's scanning preferences and/or patient conditions. For example, some doctors may perform intraoral scanning (e.g., in a standard scanning mode) after using a retraction cord to expose a margin line of a preparation. Other doctors may use a partial retraction scanning technique in which only portions of the margin line are exposed and scanned at a time (e.g., performing scanning in a partial retraction scanning mode).

By way of non-limiting example, dental procedures may be broadly divided into prosthodontic (restorative) and orthodontic procedures, and then further subdivided into specific forms of these procedures. Additionally, dental procedures may include identification and treatment of gum disease, sleep apnea, and intraoral conditions. The term prosthodontic procedure refers, inter alia, to any procedure involving the oral cavity and directed to the design, manufacture or installation of a dental prosthesis at a dental site within the oral cavity (intraoral site), or a real or virtual model thereof, or directed to the design and preparation of the intraoral site to receive such a prosthesis. A prosthesis may include any restoration such as crowns, veneers, inlays, onlays, implants and bridges, for example, and any other artificial partial or complete denture. The term orthodontic procedure refers, inter alia, to any procedure involving the oral cavity and directed to the design, manufacture or installation of orthodontic elements at a intraoral site within the oral cavity, or a real or virtual model thereof, or directed to the design and preparation of the intraoral site to receive such orthodontic elements. These elements may be appliances including but not limited to brackets and wires, retainers, clear aligners, or functional appliances.

For many prosthodontic procedures (e.g., to create a crown, bridge, veneer, etc.), a preparation tooth is created (e.g., by grinding a portion of a tooth to a stump). The preparation tooth has a margin line that can be important to proper fit of a dental prosthesis. After the preparation tooth is created, a practitioner performs operations to ready that preparation tooth for scanning. Readying the preparation tooth for scanning may include wiping blood, saliva, etc. off of the preparation tooth and/or separating a patient's gum from the preparation tooth to expose the margin line.

In some instances, a practitioner will perform a standard preparation (full retraction) technique to expose an entirety of the margin line at once by inserting a cord around the preparation tooth between the preparation tooth and the patient's gum and then removing the cord before generating a set of intraoral scans of the preparation tooth. The soft tissue of the gum will then revert back to its natural position, and in many cases collapses back over the margin line, after a brief time period. Accordingly, some of intraoral scan data 135A-N may include scans that were taken before the gum has collapsed over the margin line, and other intraoral scan data 135A-N may include scans that were taken after the gum has collapsed over the martin line. As a result, some scan data is superior to other scan data in depicting the preparation tooth, and in particular in depicting the margin line. In some embodiments, the dental practitioner may provide an indication that a standard preparation technique will be used for a preparation tooth (e.g., by pressing a button or making a selection). Alternatively, intraoral scan application 115 may analyze the scan data and automatically determine (i.e. without user input) that a standard preparation technique was performed based on the scan data.

In some instances a dental practitioner performs a partial retraction scanning technique. For the partial retraction scanning technique, the gingiva is pushed aside by a tool to expose a small section of the margin line of the sub-gingival preparation. That small section is scanned, and the tool is moved, allowing the small section of the gingiva to collapse back over margin line and exposing another small section of the margin line. Accordingly, readying the preparation tooth for scanning may include using a tool to expose just a portion of the margin line, which is then scanned while it is exposed. Readying the preparation tooth may then include using the tool to expose another portion of the margin line, which is scanned while it is exposed. This process may continue until all of the margin line has been scanned.

Examples of tools that may be used to expose a portion of the margin line at a time include a dental probe, a dental spatula, a triple syringe, an air gun, dental floss, a water gun, and so on. In some embodiments, specific tools are developed for exposing one or more portions of the margin line around one or more teeth (e.g., a first tool for exposing an interproximal portion of a margin line, a second tool for exposing a lingual portion of a margin line, and so on). Different tools developed for exposing different portions of the margin line of a tooth may have protrusions, lengths, probes, spatulas, etc. with different lengths, widths, angles, and so on. Any of these tools may provide additional information used to supplement a 3D surface of a dental site generated from intraoral scans.

In some embodiments, the dental practitioner may provide an indication that a partial preparation technique will be used for a preparation tooth (e.g., by pressing a button or making a selection). Alternatively, intraoral scan application 115 may analyze the scan data and automatically determine (i.e. without user input) that a partial retraction preparation technique was performed based on the scan data.

During intraoral scanning, intraoral scan application 115 may generate a 3D surface of a dental site by stitching together multiple intraoral scans or images. Once a scan session is complete (e.g., all images for an intraoral site or dental site have been captured), intraoral scan application 115 may generate a virtual 3D model of one or more scanned dental sites. To generate the virtual 3D model, intraoral scan application 115 may register and "stitch" or merge together the intraoral scans or images generated from the intraoral scan session. In one embodiment, performing registration includes capturing 3D data of various points of a surface in multiple scans or images (views from a camera), and registering the scans or images by computing transformations between the scans or images. In one embodiment, the 3D data may be in the form of multiple height maps, which may be projected into a 3D space of a 3D model to form a portion of the 3D model. In one embodiment, the 3D data may be in the form of 3D point clouds. The scans or images may be integrated into a common reference frame by applying appropriate transformations to points of each registered scan or image and projecting each scan or image into the 3D space.

In one embodiment, registration is performed for adjacent or overlapping intraoral scans or images (e.g., each successive frame of an intraoral video). In one embodiment, registration is performed using blended scans or images. Registration algorithms are carried out to register two adjacent intraoral scans or images (e.g., two adjacent blended intraoral scan or images) and/or to register an intraoral scan or image with a 3D model, which essentially involves determination of the transformations which align one scan or image with the other scan or image and/or with the 3D model. Registration may involve identifying multiple points in each scan or image (e.g., point clouds) of a scan or image pair (or of a scan or image and the 3D model), surface fitting to the points, and using local searches around points to match points of the two scans or images (or of the scan or image and the 3D model). For example, intraoral scan application 115 may match points of one scan or image with the closest points interpolated on the surface of another scan or image, and iteratively minimize the distance between matched points. Other registration techniques may also be used.

Intraoral scan application may repeat registration for all scans or images of a sequence of intraoral scans or images to obtain transformations for each scan or image, to register each scan or image with the previous one and/or with a common reference frame (e.g., with the 3D model). Intraoral scan application 115 integrates all scans or images into a single virtual 3D model by applying the appropriate determined transformations to each of the scans or images. Each transformation may include rotations about one to three axes and translations within one to three planes.

The registration and stitching performed during scanning to produce the 3D surface may be a similar registration and stitching process to the process that is performed after scanning to produce the 3D model. However, the registration and stitching performed to produce the 3D model may be more time consuming and take more processing power than that performed to produce the 3D surface. Accordingly, the 3D surface may be periodically or continuously updated during scanning of the dental site. In one embodiment, the 3D surface of the dental site is updated in real time or near-real time as scanning is performed to provide a user with visual feedback as to scanning progress.

In some instances, a generated 3D surface or 3D model that has been generated by registering and stitching together intraoral scans lacks data or definition for one or more regions or portions of the 3D surface/model. Data or definition may be lacking for one or more regions or portions of the dental site due to a size of the intraoral scanner, an amount of space in a patient's oral cavity, additional objects in the oral cavity that block a view of the portion of the dental site, and so on. For such situations, it can be beneficial to enable a supplemental surface data scanning mode, which may be used to provide additional surface data that can supplement the surface data of a generated 3D surface or 3D model of a dental site. The supplemental surface data scanning mode may be used to supplement any other scanning mode, such as a partial retraction scanning mode, a standard scanning mode, intraoral scanning for orthodontic treatment, and so on.

In one embodiment, intraoral scan application 115 includes a partial retraction scanning module 118, a standard scanning module 119 and a supplemental surface data scanning module 117. Standard scanning module 119 may provide a standard scanning mode in which one or more first algorithms are used to process intraoral scan data. Partial retraction scanning module 118 may provide a partial preparation scanning mode in which one or more second algorithms are used to process intraoral scan data. The first algorithms and second algorithms may use different rules, settings, thresholds and so on to select which images and which portions of images are used to construct portions of a virtual 3D model. Supplemental surface data scanning module 117 may provide one or more additional algorithms to supplement one or more other scanning modes. The additional algorithms may include algorithms to identifying and/or recognizing tools in intraoral scans, for determining properties of those tools, and/or for determining additional surface data for a dental site based on the properties of the tools and/or a detected position and/or orientation of the tool relative to the dental site. More details about the standard scanning mode and partial preparation scanning mode can be found in U.S. application Ser. No. 17/011,930, filed Sep. 3, 2020, entitled "Automated Detection, Generation and/or Correction of Dental Features in Digital Models," which is incorporated by reference herein in its entirety.

In some embodiments, supplemental surface data scanning module 117 uses one or more trained machine learning models to perform object recognition to recognize a tool in one or more intraoral scans. Intraoral scans may be input into the trained machine learning model, which may output an indication of a detected tool and a position of the detected tool in the scan. In one embodiment, the trained machine learning model outputs a map indicating for each point in the scan whether the point is classified as a tool or as a point of a dental site.

One type of machine learning model that may be used for the tool recognition is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize that the image contains a face or define a bounding box around teeth in the image.

In one embodiment, a U-net architecture is used. A U-net is a type of deep neural network that combines an encoder and decoder together, with appropriate concatenations between them, to capture both local and global features. The encoder is a series of convolutional layers that increase the number of channels while reducing the height and width when processing from inputs to outputs, while the decoder increases the height and width and reduces the number of channels. Layers from the encoder with the same image height and width may be concatenated with outputs from the decoder. Any or all of the convolutional layers from encoder and decoder may use traditional or depth-wise separable convolutions.

In one embodiment, a class of machine learning model called a MobileNet is used. A MobileNet is an efficient machine learning model based on a streamlined architecture that uses depth-wise separable convolutions to build light weight deep neural networks. MobileNets may be convolutional neural networks (CNNs) that may perform convolutions in both the spatial and channel domains. A MobileNet may include a stack of separable convolution modules that are composed of depthwise convolution and pointwise convolution (conv 1×1). The separable convolution independently performs convolution in the spatial and channel domains. This factorization of convolution may significantly reduce computational cost from $HWNK^2M$ to $HWNK^2$ (depthwise) plus HWNM (conv 1×1), $HWN(K^2+M)$ in total, where N denotes the number of input channels, $K^2$ denotes the size of convolutional kernel, M denotes the number of output channels, and H×W denotes the spatial size of the output feature map. This may reduce a bottleneck of computational cost to conv 1×1.

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and back-propagation to tune the weights of the network across all its layers and nodes such that the error is minimized. In many applications, repeating this process across the many labeled inputs in the training dataset yields a network that can produce correct output when presented with inputs that are different than the ones present in the training dataset. In high-dimensional settings, such as large images, this generalization is achieved when a sufficiently large and diverse training dataset is made available.

Training of the machine learning model and use of the trained machine learning model (e.g., for the excess material removal algorithm and/or the excess gingiva removal algorithm) may be performed by processing logic executed by a processor of a computing device. For training of the machine learning model, a training dataset containing hundreds, thousands, tens of thousands, hundreds of thousands or more images should be used to form a training dataset. A training dataset may be gathered, where each data item in the training dataset may include an image or scan and an associated label that identifies pixels or points associated with one or more classes of tools. Alternatively, the model may output a map indicating which points or pixels are classified as a tool. A shape of the tool may be determined from those pixels or points and then used to perform a lookup in a tool library to identify the detected tool.

A machine learning model may be trained using the scans or images with the labeled tool information. The machine learning model may be trained to classify pixels in images as belonging to one or more classes (e.g., tool A, tool B, tool C, no tool, etc.). The result of this training is a function that can identify specific types of tools directly from intraoral scans. In particular, the machine learning model may be trained to generate a probability map, where each point in the probability map corresponds to a pixel of an input image or scan and indicates one or more of a first probability that the pixel represents a first tool class, a second probability that the pixel represents a second tool class, a third probability that the pixel represents a third tool class, a fourth probability that the pixels represents a fourth tool class, a fifth probability that the pixel represents a fifth tool class, and so on. In embodiments, the machine learning model may also be trained to identify dental classes, such as tooth or gums.

During an inference stage (i.e., use of the trained machine learning model), the intraoral scan or scans (and optionally other data) is input into the trained model, which may have been trained as set forth above. The trained machine learning model outputs a probability map, where each point in the probability map corresponds to a pixel in the scan or image and indicates probabilities that the pixel represents one or more tool classes and/or dental classes.

In one embodiment, the probability map is used to update the intraoral image/scan (or 3D surface/model generated therefrom) to generate a modified intraoral image/scan/surface/model. The probability map may be used to determine pixels that represent a tool. Data for pixels labeled as a tool may then be removed from or hidden in the intraoral image/scan. Alternatively, the data for pixels labeled as a tool may be augmented based on knowledge about the tool. This may include adding further information about a tool (e.g., further surface data for the tool) to the 3D surface or 3D model, such as adding additional surface data for the tool to the 3D surface or 3D model. The tool may additionally be presented using a different visualization than one or more dental site. For example, the tool may be shown using a different amount of transparency than the dental site.

Intraoral scan application 115 may generate a 3D model and/or 3D surface from intraoral images/scans, and may display the 3D model/surface to a user (e.g., a doctor) via a user interface. The 3D model/surface can then be checked visually by the doctor. The doctor can virtually manipulate the 3D model/surface via the user interface with respect to up to six degrees of freedom (i.e., translated and/or rotated with respect to one or more of three mutually orthogonal axes) using suitable user controls (hardware and/or virtual) to enable viewing of the 3D model/surface from any desired direction. The doctor may review (e.g., visually inspect) the generated 3D model/surface of an intraoral site and determine whether the 3D model/surface is acceptable (e.g., whether a margin line of a preparation tooth is accurately represented in the 3D model).

In some embodiments, if the 3D model/surface is not acceptable due to missing data for one or more portions or a low definition for one or more portions, intraoral scan application 115 may recommend rescanning at least a portion of the dental site with a supplemental surface data scanning mode turned on. The doctor may then rescan the portion of the dental site using a tool. The tool may be captured in one or more scans, and properties of the tool may be used to augment surface data for the one or more portions for which there was missing data or low definition. In some embodiments, intraoral scan application 115 may automatically assess the 3D surface/model and suggest that the supplemental surface data scanning mode be used. In some embodiments, intraoral scan application 115 may automatically enable the supplemental surface data scanning mode responsive to identifying a particular type of tool in intraoral scans.

Intraoral scan application 115 may direct a user to generate one or more additional intraoral scans of the dental site corresponding to the portion of the 3D model (and corresponding set or sets of intraoral images) that was determined to have missing data or low definition. The user may then use the scanner 150 to generate the one or more additional intraoral scans (e.g., using a partial retraction scanning technique or a full retraction scanning technique), which at least partially overlaps with previously generated intraoral scans. The one or more additional intraoral scans may be registered with the 3D model/surface (and/or with the intraoral scan data used to create the 3D model/surface) to provide a composite of the 3D model and the one or more additional intraoral scans. The additional intraoral scans may depict the tool, and a relative position and orientation of the tool and the dental site may be determined for the additional intraoral scans. This relative position and orientation may be used along with known properties of the tool to supplement the 3D model/surface with additional surface data.

Once the doctor (e.g., dentist) has determined that the 3D model is acceptable, the doctor may instruct computing device 105 to send the 3D model to computing device 106 of dental lab 110. Computing device 106 may include a dental modeling application 120 that may analyze the 3D model to determine if it is adequate for manufacture of a dental prosthetic. If the 3D model is deemed suitable (or can be modified such that it is placed into a condition that is deemed suitable), then a dental prosthetic may be manufactured from the 3D model. If the 3D model cannot be placed into a suitable condition, then instructions may be sent back to the dental office 108 to generate one or more additional intraoral scans of one or more regions of the dental site.

FIGS. 2A-14 illustrate methods related to intraoral scanning and generation of virtual 3D models of dental sites. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a computing device executing intraoral scan application 115.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 2A illustrates a flow diagram for a method 200 of implementing a supplemental surface data scanning mode, in accordance with an embodiment. At block 215, processing logic receives an indication that a tool that provides supplemental surface data will be used during intraoral scanning. Many different types of dental tools may be used, each of which may provide different types of data for supplementing surface data of a 3D surface. Examples of such tools include a dental probe, a dental mirror, an interproximal space measurement tool, a pocket measurement tool, and so on. The tool may be separate from an intraoral scanner, and may move freely relative to the intraoral scanner and relative to a dental site during scanning.

In one embodiment, at block 220 processing logic receives a user input selecting a supplemental surface data scanning mode. Processing logic may provide a graphical user interface (GUI) which may include user selectable options for one or more intraoral scanning modes. For example, the GUI may include user selectable options for a restoration scanning mode, for a correction scanning mode, for a partial retraction scanning mode and/or a standard preparation scanning mode. The GUI may further include a user selectable option for enabling or disabling a supplemental surface data scanning mode, which may be enabled or disabled for any of the other scanning modes.

In one embodiment, a user may have already performed or started intraoral scanning. The user may have used or may be using a tool during the intraoral scanning, and the tool may be included in one or more intraoral scans. At block 225, processing logic may perform object recognition on the intraoral scans and/or on a 3D surface generated from the intraoral scans, and may recognize the tool based on the object recognition. The object recognition may be performed, for example, based on application of the intraoral scans and/or the 3D surface (or projections of the 3D surface to one or more planes) to a trained machine learning model that has been trained to recognize one or more types of dental tools as described above. The machine learning model may have been trained as set forth herein above in embodiments. In one embodiment, the tool has a color, a surface pattern, a shape, etc. that is not commonly found in a mouth.

In one embodiment, processing logic performs image processing, which may or may not include application of machine learning, to identify the specific color, surface pattern, etc. of the tool that is not commonly found in a mouth. Processing logic may determine a shape of a space occupied by the color, surface pattern, etc., and may identify a tool by performing a lookup in a tool library using the determined shape of the space occupied by the color, surface pattern, etc. In one embodiment, tool recognition is performed as set forth in U.S. application Ser. No. 16/809,451, filed Mar. 4, 2020, entitled "Foreign Object Filtering for Intraoral Scanning," which is incorporated by reference herein in its entirety.

In one embodiment, at block 230 processing logic receives an identification of a tool that is being used or that is to be used. The identification may be provided based on user input in one embodiment. For example, the GUI of the intraoral scan application may provide a dropdown menu with a list of tools that a user may select from. Alternatively, the user may scan a bar code (e.g., a 2D bar code) or other identifier on the tool using the intraoral scanner to automatically identify the tool. The bar code or identifier may be used to perform a lookup in a tool library to identify the tool. In embodiments, a user may also request to add a new tool to the tool library, and the GUI may instruct the user to perform one or more steps to calibrate the tool, scan the tool, and/or add the tool to the tool library.

In one embodiment, at block 235 processing logic determines known properties of the tool. The tool may have been selected from a tool library, or a lookup into the tool library may have been performed to identify an entry in the tool library for the tool. The entry in the tool library for the tool may include properties of the tool, such as a tool geometry (e.g., a tool shape), locations and/or configurations of one or more fiducials or detectable features on the tool, distances between the locations of the fiducials/detectable features and a tip of the tool, a position and/or shape of a reflective surface of the tool, force measurement configuration information of the tool, a volume of a probe of the tool (e.g., a thickness of the probe, width of the probe, length of the probe, etc.), and so on.

At block 240, processing logic implements a supplemental surface data scanning mode in which the determined properties of the tool may be used together with a determined relative position and orientation of the tool and a dental site to determine supplemental surface data for one or more points on the dental site that might be hidden from direct viewing by the intraoral scanner.

FIG. 2B illustrates a flow diagram for a method 250 of implementing a supplemental surface data scanning mode, in accordance with an embodiment. At block 255 of method 250, processing logic receives first intraoral scan data. At block 260, processing logic automatically determines that a supplemental surface data scanning mode is to be used to process the first intraoral scan data. Such automatic determination may be made, for example, based on application of machine learning and/or image processing to the first intraoral scan data. Based on the application of machine learning and/or image processing a tool may be recognized. Based on the presence of the tool in the intraoral scans, processing logic may automatically activate the supplemental surface data scanning mode.

At block 265, processing logic processes the first intraoral scan data using one or more first algorithms (e.g., first algorithms for selecting scans to use, for blending or merging scans together, for performing registration and/or stitching between scans, for performing moving tissue detection and removal, for performing excess material detection and removal, for using tool properties to determine surface data, etc.). The first algorithms may be used to generate a 3D surface of a dental site using the first intraoral scan data in accordance with the supplemental surface data scanning mode.

FIG. 2C illustrates a flow diagram for a method 270 of recommending use of a supplemental surface data scanning mode, in accordance with an embodiment. At block 272 of method 270, processing logic receives first intraoral scan data of a dental site. At block 274, processing logic determines that a first portion of the dental site is hidden from direct view in the first intraoral scan data. For example, processing logic may generate a 3D surface using the first intraoral scan data, and may identify a void or region with low definition on the 3D surface at the first portion. The void or area with low definition may be due to a bad angle between the scanner and the first portion of the dental site and/or occluding surfaces that block a direct view of the first portion of the dental site, for example.

At block 276, processing logic recommends that second intraoral scan data of the dental site be generated and that a tool that provides supplemental surface data be used to provide supplemental surface data for the first portion of the dental site during generation of the second intraoral scan data. Processing logic may recommend, for example, that a supplemental surface data scanning mode be activated. Processing logic may additionally recommend a particular type of tool to use with the supplemental surface data scanning mode. Such a recommendation may be based at least in part on properties of the first portion, such as a location of the first portion, surrounding tissue around the first portion, whether or not the first portion is subgingival, whether or not the first portion is an interproximal region between adjacent teeth, and so on.

At block 278, processing logic receives user input selecting the supplemental surface data scanning mode. At block 280, processing logic implements the supplemental surface data scanning mode. This may include the user performing further scanning of the dental site using the tool to generate second intraoral scan data. The second intraoral scan data may then be processed according to algorithms of the supplemental surface data scanning mode to use properties of the tool to determine surface information for the first portion of the dental site.

FIG. 3 illustrates a flow diagram for a method 300 of supplementing a 3D surface of a dental site based on properties of a detected tool, in accordance with an embodiment. At block 305 of method 300, processing logic receives intraoral scan data of at least a first portion of a dental site, the intraoral scan data having been generated from one or more points of view of an intraoral scanner. At block 310, processing logic detects at least a portion of a tool in the intraoral scan data (e.g., using object recognition based on application of machine learning, using image processing, etc.). At block 312, processing logic optionally detects a position and orientation of the tool relative to the dental site. To use some properties of some types of tools to determine surface data for a dental site knowledge of the relative position and orientation of the tool and the dental site is necessary. To use some properties for other types of tools to determine surface data for a dental site knowledge of the relative position and orientation of the tool and the dental site is not necessary.

At block 315, processing logic generates a 3D surface of the dental site (e.g., of the first portion of the dental site) based on the intraoral scan data. At block 320, processing logic supplements the 3D surface of the dental site with additional surface data of a second portion of the dental site that is hidden from direct viewing by the intraoral scanner from the one or more points of view (or that has a poor viewing angle from the one or more points of view). The additional surface data is based at least in part on properties of the detected tool and/or the detected position and/or orientation of the tool relative to the dental site. Various techniques for determining additional surface data based on properties of a detected tool are set forth in greater detail below with reference to FIGS. 4A-11B.

At block 325, processing logic outputs a view of the 3D surface of the dental site to the display, wherein a first visualization is used for the 3D surface. At block 330, processing logic optionally generates a 3D surface of the tool and outputs a view of the 3D surface of the tool at the detected position and orientation relative to the dental site. The first visualization or a second visualization that is different from the first visualization may be used to display the tool. In one embodiment, the first visualization used for the dental site includes a first level of transparency, such as 0% transparency and the second visualization used for the tool includes a second level of transparency, such as 20-90% transparency. This enables a user to view the relative position and orientation of the tool and the dental site while still being able to view regions of the dental site that might be blocked from view of a user by the tool. In embodiments, the first visualization of the dental site includes one or more first colors (e.g., white or off white for a tooth and/or red or pink for a gingival surface) and the second visualization of the tool includes one or more second colors (e.g., gray or silver).

In some instances, only a portion of the tool is visible in the intraoral scan data. The portion of the tool may be used to perform a lookup in a tool library to identify an entry in the library for the tool. The entry in the tool library may include information for the tool, including 3D surface data for the tool (e.g., for an entirety of the tool). Once the tool is identified in the tool library, a 3D surface of the tool from the tool library may be registered to the 3D surface of the portion of the tool. The 3D surface of the entire tool (or a portion of the tool that is a larger portion than the portion of the tool that was visible in the intraoral scan data) may then be generated and output relative to the 3D surface of the dental site.

In some instances, the tool is filtered out and not displayed. Examples of how to supplement the surface data for the tool and for filtering out the tool are set forth in application Ser. No. 16/809,451, filed Mar. 4, 2020, entitled "Foreign Object Filtering for Intraoral Scanning," which is incorporated by reference herein in its entirety.

In some embodiments, a GUI of the intraoral scan application may provide user selectable inputs for changing a visualization of the tool. For example, a user may be provided with options for changing a color of one or more dental surface and/or a surface of the tool, for changing a transparency level of the dental site and/or of the tool, for selecting to supplement data for the tool from a tool library or to filter out the tool (e.g., and not display the tool), and so on. In one embodiment, at block 335 processing logic receives a user input to change a visualization of the 3D surface of the tool (e.g., to change a transparency level or color of the tool). At block 340, processing logic may update a visualization of the 3D surface of the tool based on the user input.

FIG. 4A illustrates a flow diagram for a method 400 of supplementing a 3D surface of a dental site based on properties of a detected tool with a force sensitive tip, in accordance with an embodiment. Method 400 may be performed, for example, at block 320 of method 300. At block 405 of method 400, processing logic determines a known shape of a tool and/or a known distance between a detected portion of the tool and a tool tip for a tool used during intraoral scanning. The tool may have been identified, for example, based on application of intraoral scan data that includes a depiction of the tool and of a dental site to a machine learning model and/or to image processing or surface processing algorithms.

At block 410, processing logic determines a contour of a surface of a portion of a dental site that is hidden from direct viewing based at least in part on a) a detected portion of the tool in a plurality of received intraoral scans that were generated while the tool tip was moved along a surface of the portion of the dental site and b) the known distance from the detected portion of the tool to the tool tip. For example, one or more intraoral scans may include a portion of the tool and a first portion of the dental site. A tip of the tool may be pressed against a second portion of the dental site that is hidden from direct view by the intraoral scanner. A known distance between (and relative positions of) the detected portion of the tool and the tip may be used to infer a location of a surface of the dental site at the second portion based on the relative detected positions/orientations of the dental site and portion of the tool.

Figure 5A:
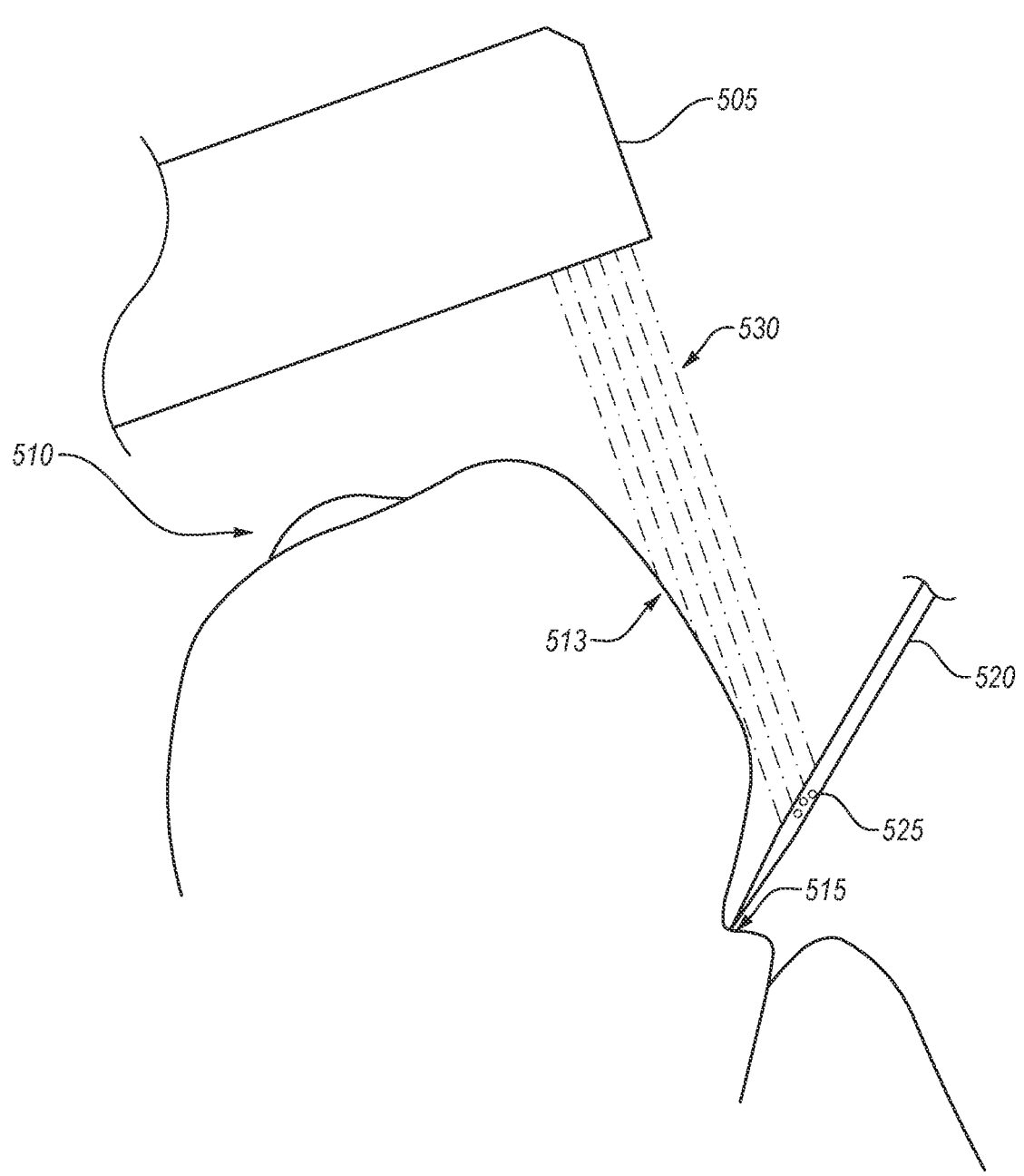
FIG. 5A illustrates scanning of a dental site and a tool, in accordance with an embodiment.

FIG. 5A illustrates scanning of a dental site and a tool, in accordance with an embodiment. In FIG. 5A, an intraoral scanner 505 outputs light (e.g., rays of light) that is reflected off of both a dental site 510 and the tool 520. Returning light 530 reflected off of the dental site 510 and the tool 520 is received by the intraoral scanner 505 and received at one or more image sensors for generation of intraoral scan data. As shown, a first portion 513 of the dental site is in a direct line of sight of the intraoral scanner 530, but a second portion

515 of the dental site is hidden from direct viewing by the intraoral scanner 505 (e.g., is not in the direct line of sight of the intraoral scanner). However, features 525 on the tool are in the direct line of site of the intraoral scanner 505, and are depicted in intraoral scan data. An intraoral scan application may process the intraoral scan data to identify the tool and determine a relative position and orientation of the tool 520 and the dental site 510. The intraoral scan application may then determine a position of the tip of the tool 520 at the second portion of the dental site 515. By moving the tool 520 such that the tip of the tool traces the second portion of the dental site during intraoral scanning, a 3D surface of the second portion of the dental site may be determined even though it is hidden from view.

As illustrated, rays of light output by scanner 505 and rays of light 530 returning to scanner 505 are parallel, which represents a telecentric design. It should be noted that in embodiments the rays of light output by the scanner 505 and/or rays of returning light 530 may not be parallel (e.g., scanners may have different ray patterns than those shown). In one embodiment, the scanner 505 may output a structured light pattern from multiple locations (e.g., multiple structured light projectors disposed at different locations on a head of intraoral scanner 505. Rays of the structured light pattern may not be parallel, and may diverge and/or converge at some divergence/convergence angle or angles. The scanner 505 may additionally include multiple cameras or image sensors disposed at different positions on the head of the scanner 505. Such cameras may receive some portion (or all) of the rays of returning light. In such embodiments, the second portion 515 of the dental site may be obstructed from view if none of the cameras on the head of scanner 505 has a sufficient viewing angle to the second portion 515 or that not enough of the cameras in the head of the scanner 505 have a sufficient viewing angle of the second portion 515 (e.g., that not enough cameras have sufficient viewing angles for returning light rays of light from at least one of the structured pattern projectors. Accordingly, second portion 515 may be hidden from direct view if either the structured light projectors or the cameras are blocked from direct view of the second portion 515. An example intraoral scanner that includes an array of structured light projectors and cameras is described in U.S. patent application Ser. No. 16/446,181, filed Jun. 19, 2019, which is incorporated by reference herein in its entirety.

Figure 5B:
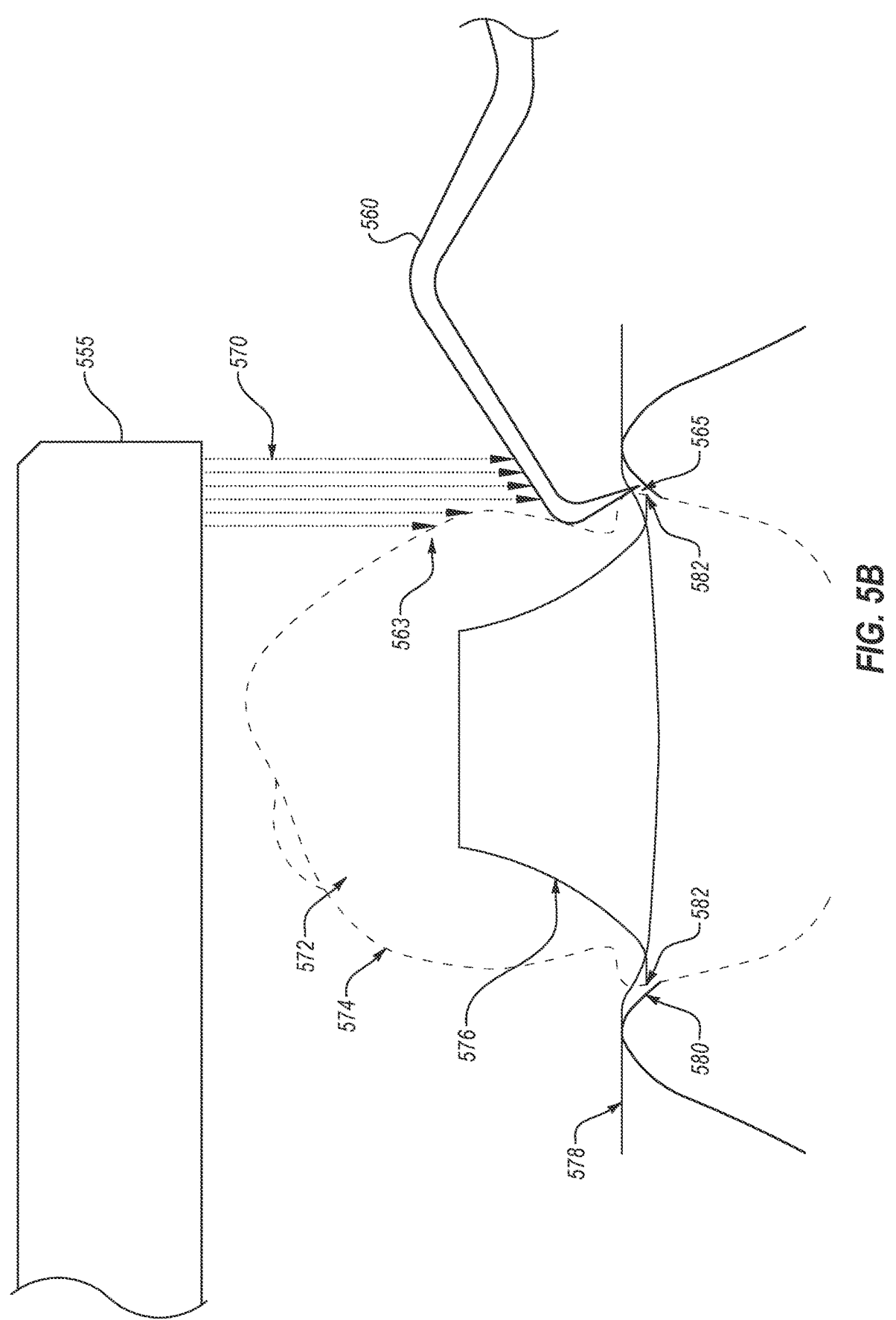
FIG. 5B illustrates scanning of a dental site and a tool, in accordance with an embodiment.

FIG. 5B illustrates scanning of a dental site and a tool, in accordance with an embodiment. In FIG. 5B, an intraoral scanner 555 outputs light (e.g., rays of light) that is reflected off of both a dental site 572 and the tool 560. As shown, the dental site 572 may include a preparation 576 that will underlie a crown 572 (which may not be present during scanning). The dental site may further include a gum line 578 and a margin line 582 that may be covered by the gum line 578 generally, but that may be exposed by the tool 560 during scanning (e.g., the tool 560 may push back or retract a portion of the gums 580 to provide access to the margin line 582, which may be a sub-gingival margin line). Returning light 570 reflected off of the dental site and the tool 560 is received by the intraoral scanner 555 and received at one or more image sensors for generation of intraoral scan data. As shown, a first portion 563 of the dental site is in a direct line of sight of the intraoral scanner 555, but a second portion 565 of the dental site is a sub-gingival portion of the dental site and is hidden from direct viewing by the intraoral scanner 555 (e.g., is not in the direct line of sight of the intraoral scanner). However, the tool 560 is in the direct line of site of the intraoral scanner 555, and a portion of the tool

560 is depicted in intraoral scan data. An intraoral scan application may process the intraoral scan data to identify the tool and determine a relative position and orientation of the tool 560 and the first portion 563 of the dental site. The intraoral scan application may then determine a position of the tip of the tool 560 (which may be at a sub-gingival location) at the second portion of the dental site 565. By moving the tool 560 such that the tip of the tool traces the second portion of the dental site during intraoral scanning, a 3D surface of the second portion of the dental site may be determined even though it is hidden from view.

As illustrated, rays of light output by scanner 505 and rays of light 570 returning to scanner 505 are parallel. It should be noted that in embodiments the rays of light output by the scanner 505 and/or rays of returning light 570 may not be parallel (e.g., scanners may have different ray patterns than those shown). In one embodiment, the scanner 505 may output a structured light pattern from multiple locations (e.g., multiple structured light projectors disposed at different locations on a head of intraoral scanner 505. Rays of the structured light pattern may not be parallel, and may diverge at some divergence angle or angles. The scanner 505 may additionally include multiple cameras or image sensors disposed at different positions on the head of the scanner 505, as described above with reference to FIG. 5A.

Returning to FIG. 4A, at block 415 processing logic may determine whether the tool is a force sensitive tool (e.g., has a force sensitive tip). If the tool is not a force sensitive tool, then the method continues to block 418 and no tissue type information is determined. If the tool is a force sensitive tool, then the method may continue to block 420.

At block 420, processing logic determines measured force values as measured by the force sensitive tool (e.g., by a force sensitive tool tip), where each of the force values may be associated with a particular intraoral scan of the plurality of intraoral scans. A force sensitive dental tool may measure forces in 1 to 3 axes, and the force measurements may be synced with intraoral scans (and thus with tool position for each intraoral scan). For example, a tool may include multiple rods that each rests on two balls, which provide up to 6 points of contact in a kinematic location. A spring may hold a stylus against kinematic contacts and return a probe to a seated position following contact between the stylus and a dental site. For example, a tool may include a force sensitive probe such as provided by Renishaw® (e.g., such as their TP7M electronic strain gauge probe, TP8 kinematic probe, and so on).

At block 425, processing logic determines one or more tissue types for the second portion of the dental site based on measured force values associated with the intraoral scans. As mentioned, each force measurement may be associated with an intraoral scan, and thus with a relative position and orientation of the tool and the dental site, and a point on the dental site may be determined based on the relative position and orientation of the tool and the dental site and the known relative position of the detected portion of the tool and a tool tip of the tool. Accordingly, for each intraoral scan a point on a surface of the dental site at the second portion of the dental site (e.g., that is hidden from view) may be determined and a force value associated with that point may be determined.

For soft tissue such as gums or gingiva, force will change gradually or slowly as the tool tip is moved across a surface of the soft tissue. On the other hand, for hard tissue such as teeth force will change quickly as the tool tip is moved across the surface of the dental site. Accordingly, in one embodiment at block 430 processing logic determines a change in force between measured force values associated with sequential or close in time intraoral scans. At block 435, processing logic determines whether the change in force meets first tissue type criteria or second tissue type criteria. The first criteria may be for soft tissue, and may be met when a change in force is below a first threshold value. The second criteria may be for hard tissue, and may be met when the change in force is above the first threshold value or a second threshold value. If the first criteria are satisfied, the method continues to block 440, and the portion of the dental site is determined to be or include soft tissue. If the second criteria are satisfied, the method continues to block 445 and processing logic determines that the portion of the dental site is or includes hard tissue. The operations of blocks 430-445 may be repeatedly performed for each pair or sequence of intraoral scans generated as the tool was moved along a surface of a dental site. The tool tip may at times move over soft tissue and over hard tissue. Accordingly, tissue type information may be determined for non-visible regions of a dental site (and optionally for visible regions of the dental site).

In some embodiments, other information may be determined based on the force data in addition to or instead of tissue type. For example, force measurements may be used to detect tooth stability. For example, if a tooth is not stable, then the tooth may move responsive to application of force against the tooth. Such movement of the tooth may be determined from the force measurements. In another example, a region of a tooth that is softer than surrounding regions of the tooth may be determined. Such a softer region of the tooth may be indicative of a caries at the soft region. In another example, the force measurement for soft tissue may be used to detect gum swelling, as swollen gums have a different amount of pliability than non-swollen or healthy gums. For example, if gums are detected to be harder than normal (with a faster than normal change in force for displacements of the tool), this may indicate gum swelling. In embodiments, a detected change in force for a portion of a dental site may be compared to one or more force change criteria. Each such force change criterion may be associated with a different type of tissue or a different condition for tissue. Some examples of detectable features include, healthy tooth, caries in a tooth, healthy gums, swollen gums, loose or unstable tooth, and so on.

Figure 13:
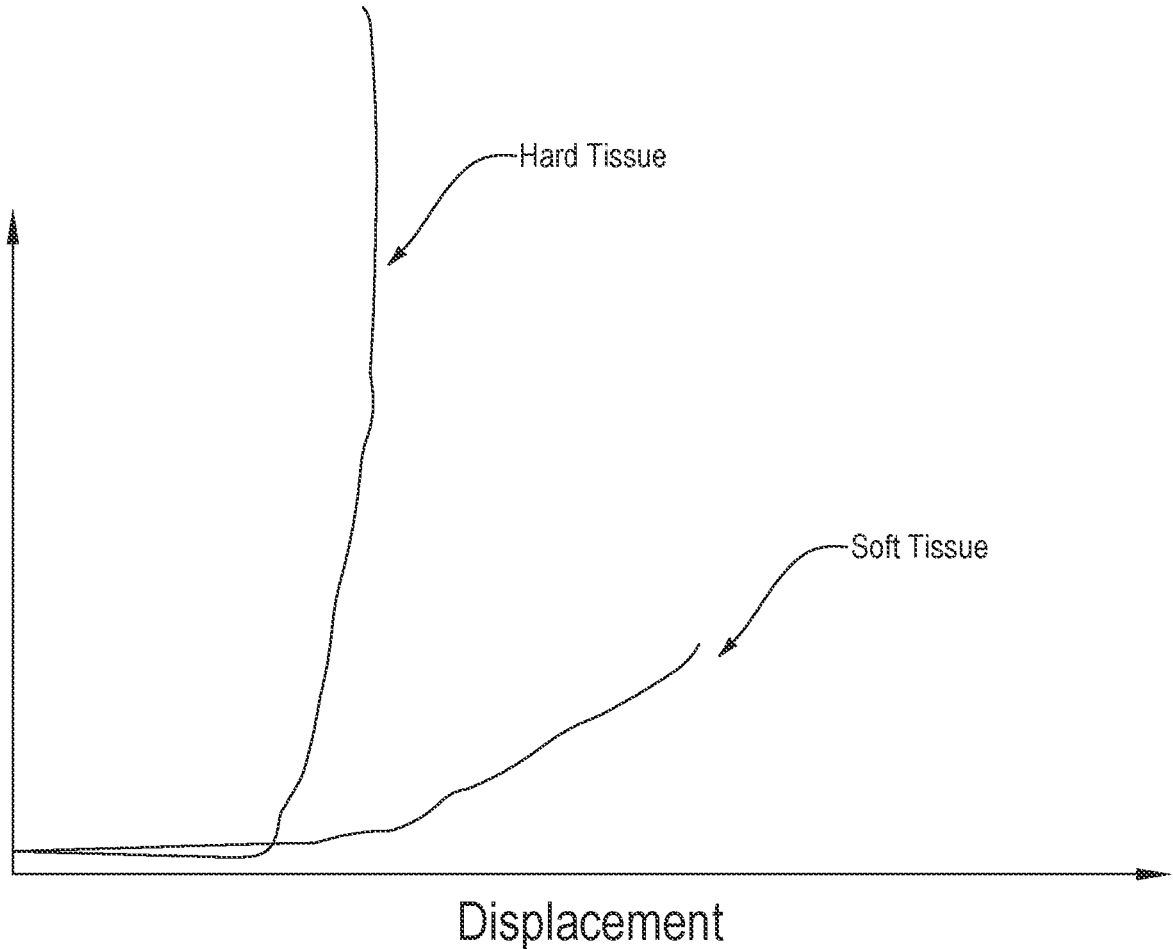
FIGS. 13-14 illustrate detection of soft tissue and hard tissue from force measurements of a force sensitive tool, in accordance with an embodiment.
Figure 14:
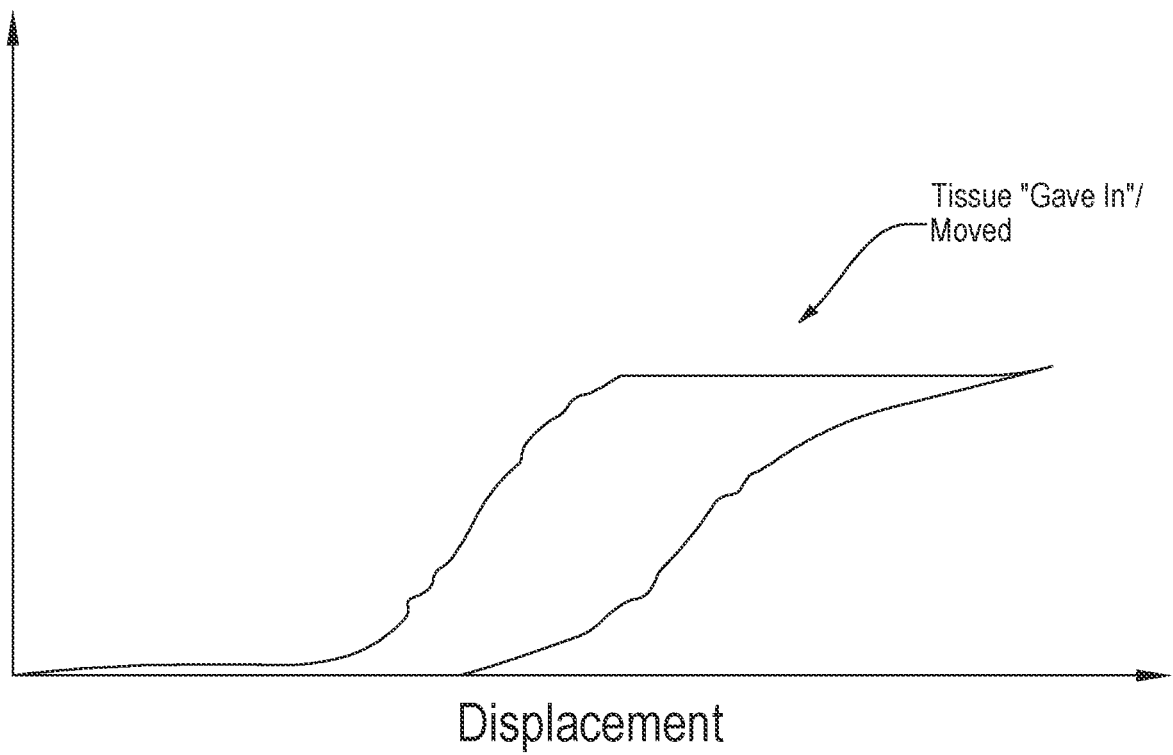

FIGS. 13-14 illustrate detection of soft tissue and hard tissue from force measurements of a force sensitive tool, in accordance with an embodiment. FIGS. 13-14 show examples of the force change profile associated with hard tissue and soft tissue, where displacement or tool tip position is displayed on the x-axis and measured force is displayed on the y-axis. As shown, for hard tissue the force changes rapidly with small changes in tool tip placement or displacement. In contrast, for soft tissue the force changes slowly with changes in tool tip placement or displacement.

In some embodiments, different visualizations are used to display different surface types. For example, surface type information may be added to a 3D surface of a dental site, and the dental site may be displayed using visualizations that take the surface type information into account. For example, soft tissue may be shown with a first color (e.g., pink) and/or a first level of transparency (e.g., 20-100% transparency) and hard tissue may be shown with a second color (e.g., white or off-white) and/or a second level of transparency (e.g., 0% transparency).

FIG. 4B illustrates a flow diagram for a method 450 of supplementing a 3D surface of a dental site based on properties of a detected tool with a force sensitive tip, in accordance with an embodiment. At block 455 of method 450, processing logic receives intraoral scan data of at least a first portion of a dental site, the intraoral scan data having been generated from one or more points of view of an intraoral scanner. At block 460, processing logic detects at least a portion of a tool in the intraoral scan data, wherein the tool comprises a force sensitive tool tip having a known distance from the detected portion of the tool. The intraoral scan data may comprise a plurality of intraoral scans that were generated while the probe was moved along a surface of the second portion of the dental site.

At block 465, processing logic generates a 3D surface of the dental site based on the received intraoral scan data. At block 470, processing logic determines a contour of the surface of the second portion of the dental site based at least in part on the detected portion of the tool in the plurality of intraoral scans and the known distance from the detected portion of the tool and the force sensitive tool tip. At block 475, processing logic determines a tissue type for the second portion of the dental site based on measured force values as measured by the force sensitive tool tip.

At block 480, processing logic supplements the 3D surface of the dental site with at least one of the determined contour or the determined tissue type of the second portion of the dental site that is hidden from direct viewing by the intraoral scanner.

FIG. 6 illustrates a flow diagram for a method 600 of supplementing a 3D surface of a dental site based on a volume of space carved out by a tool during scanning, in accordance with an embodiment. Method 600 may be performed, for example, at block 320 of method 300. At block 605 of method 600, processing logic determines known properties of a tool used during intraoral scanning and detected in intraoral scan data. The known properties may include, for example, a known shape of the tool, a known volume of a probe of the tool, a known distance between one or more detected or detectable features of the tool and the tool probe, and so on.

At block 610, processing logic determines a volume of space occupied by the probe across a plurality of intraoral scans that were generated while the tool probe was moved at a location of a portion of a dental site. The volume of space may be determined based at least in part on a) a detected portion of the tool in the intraoral scans, b) the known volume of the probe, and c) the known position of the probe relative to the detected portion or features of the tool in the intraoral scans.

At block 615, processing logic determines a surface of the dental site based at least in part of the volume of space occupied by the probe across the plurality of intraoral scans. For example, the volume of space occupied by the probe must not be hard tissue since the probe was able to occupy that volume of space. Accordingly, the volume of space may be used to determine what region of space does not include a surface of the dental site. Adjacent regions of space may then be determined as the surface of the portion of the dental site.

Figure 8A:
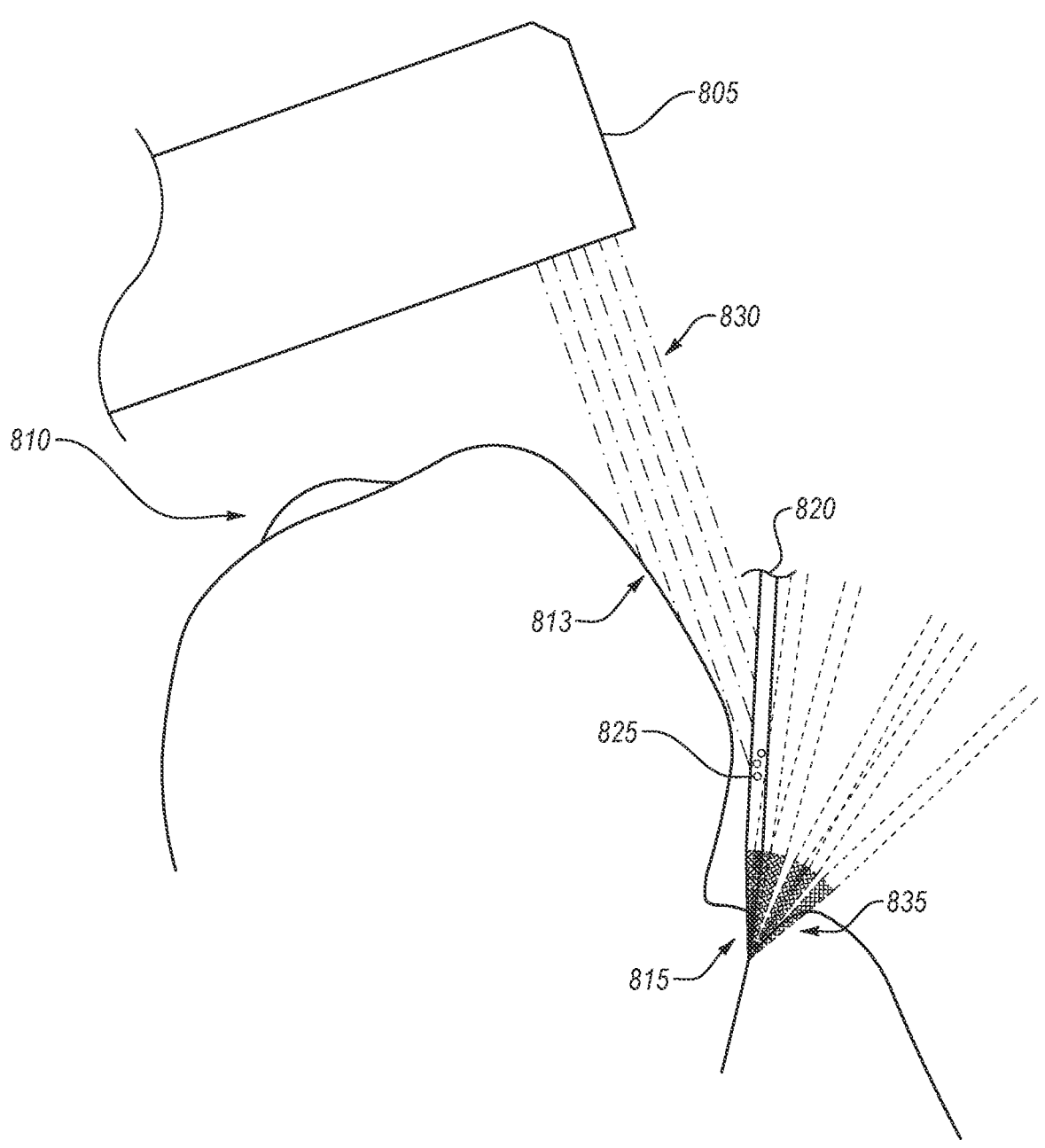
FIG. 8A illustrates scanning of a dental site and a tool while the tool carves out a volume of space, in accordance with an embodiment.

FIG. 8A illustrates scanning of a dental site and a tool while the tool carves out a volume of space, in accordance with an embodiment. In FIG. 8A, an intraoral scanner 805 outputs light (e.g., rays of light) that is reflected off of both a dental site 810 and the tool 820. Returning light 830 reflected off of the dental site 810 and the tool 820 is received by the intraoral scanner 805 and received at one or more image sensors for generation of intraoral scan data. Such intraoral scan data may be generated continuously as the tool 825 is moved or rotated to carve out a volume of space. As shown, a first portion 813 of the dental site is in a direct line of sight of the intraoral scanner 830, but a second portion 815 of the dental site is hidden from direct viewing by the intraoral scanner 805 (e.g., is not in the direct line of sight of the intraoral scanner). However, features 825 on tool are in the direct line of site of the intraoral scanner 805, and are depicted in intraoral scan data. An intraoral scan application may process the intraoral scan data to identify the tool and determine a relative position and orientation of the tool 820 and the dental site 810 for each intraoral scan. For each intraoral scan, processing logic may determine the volume of space occupied by the probe based on the relative position and orientation of the dental site and the detected features of the tool and the known relative position of the detected features of the tool and the probe of the tool. The intraoral scan application may then determine a volume of space 835 carved out by the probe across the plurality of intraoral scans by aggregating the volumes of space occupied by the probe for each of the intraoral scans. By moving the tool 820 such that the probe of the tool moves between extremes and carves out all of the negative space proximate to the second portion of the dental site, a surface of the second portion of the dental site may be determined even though it is hidden from view. For example, the free zone or volume of space 835 can help to define a margin line assuming that a motion protocol for the probe was to move the probe to contact the second portion of the dental site. This technique works well even for sub-gingival regions that might be filled with blood or saliva.

As illustrated, rays of light output by scanner 805 and rays of light 830 returning to scanner 805 are parallel. It should be noted that in embodiments the rays of light output by the scanner 805 and/or rays of returning light 830 may not be parallel (e.g., scanners may have different ray patterns than those shown). In one embodiment, the scanner 805 may output a structured light pattern from multiple locations (e.g., multiple structured light projectors disposed at different locations on a head of intraoral scanner 805. Rays of the structured light pattern may not be parallel, and may diverge at some divergence angle or angles. The scanner 805 may additionally include multiple cameras or image sensors disposed at different positions on the head of the scanner 805, which may receive returning light from different angles, as described above with reference to FIG. 5A.

Figure 8B:
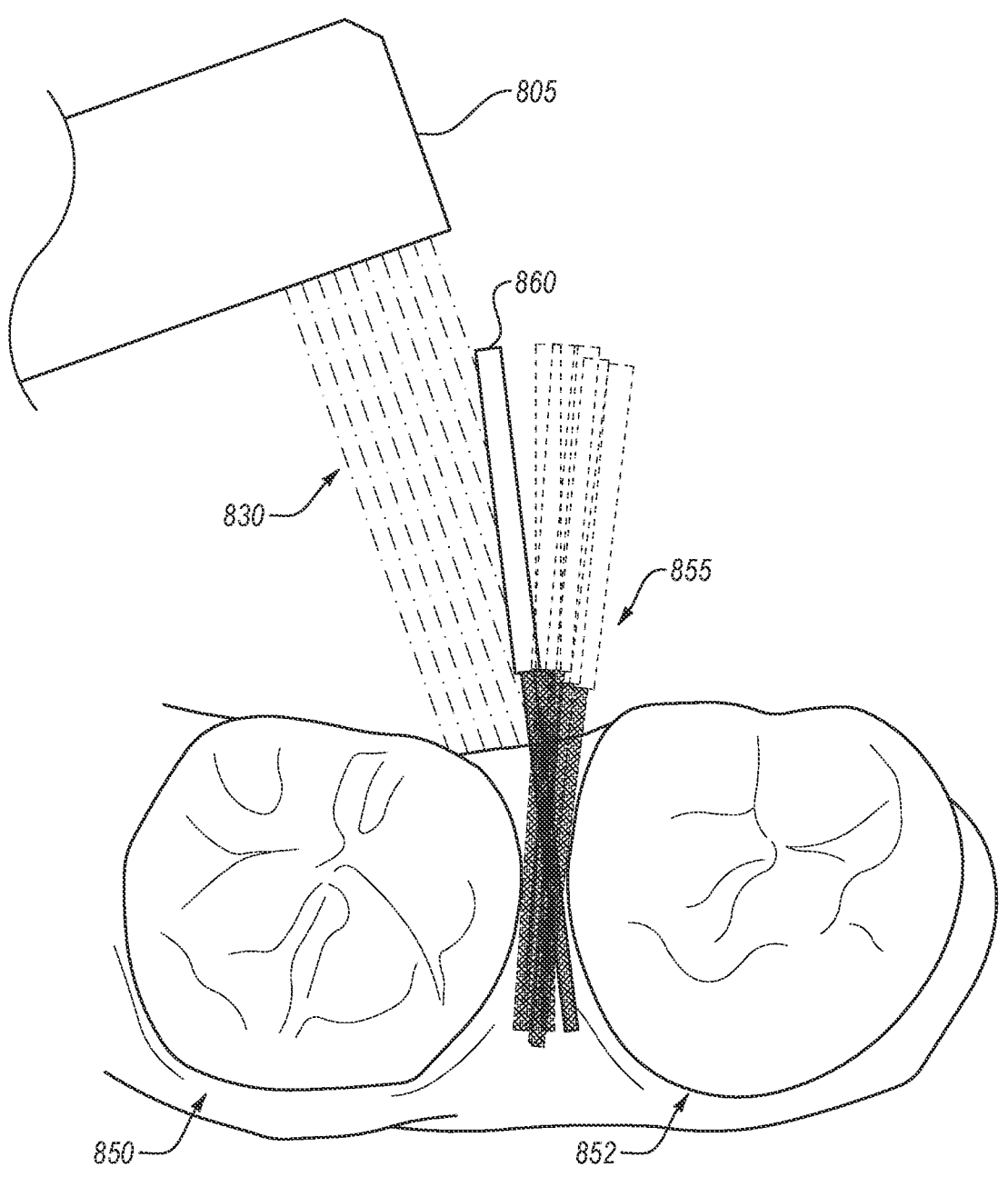
FIG. 8B illustrates scanning of a dental site and a tool while the tool carves out a volume of space, in accordance with an embodiment.

FIG. 8B illustrates scanning of a dental site and a tool while the tool carves out a volume of space, in accordance with an embodiment. In FIG. 8B, an intraoral scanner 805 outputs light (e.g., rays of light) that is reflected off of both a dental site (e.g., tooth 850 and/or adjacent tooth 852) and the tool 860. Returning light 830 reflected off of the dental site and the tool 860 is received by the intraoral scanner 805 and received at one or more image sensors for generation of intraoral scan data. Such intraoral scan data may be generated continuously as the tool 860 is moved or rotated to carve out a volume of space, where the volume of space may be an interproximal region between two adjacent teeth 850, 852. An intraoral scan application may process the intraoral scan data to identify the tool and determine a relative position and orientation of the tool 860 and the dental site for each intraoral scan. For each intraoral scan, processing logic may determine the volume of space occupied by the probe of tool 860 based on the relative position and orientation of the dental site and the detected features of the tool and the known relative position of the detected features of the tool and the probe of the tool. The intraoral scan application may then determine a volume of space 855 carved out by the probe across the plurality of intraoral scans by aggregating the volumes of space occupied by the probe for each of the intraoral scans. By moving the tool 860 such that the probe of the tool moves between extremes and carves out all of the negative space in the interproximal region between the adjacent teeth, interproximal surfaces of each of the teeth and a spacing between the teeth may be determined even though it is hidden from view. Such improved information for the interproximal regions between adjacent teeth may be used to improve orthodontic treatment in embodiments.

As illustrated, rays of light output by scanner 805 and rays of light 851 returning to scanner 805 are parallel. It should be noted that in embodiments the rays of light output by the scanner 805 and/or rays of returning light 851 may not be parallel (e.g., scanners may have different ray patterns than those shown). In one embodiment, the scanner 805 may output a structured light pattern from multiple locations (e.g., multiple structured light projectors disposed at different locations on a head of intraoral scanner 805. Rays of the structured light pattern may not be parallel, and may diverge at some divergence angle or angles. The scanner 805 may additionally include multiple cameras or image sensors disposed at different positions on the head of the scanner 805, which may receive returning light from different angles, as described above with reference to FIG. 5A.

Figure 8C:
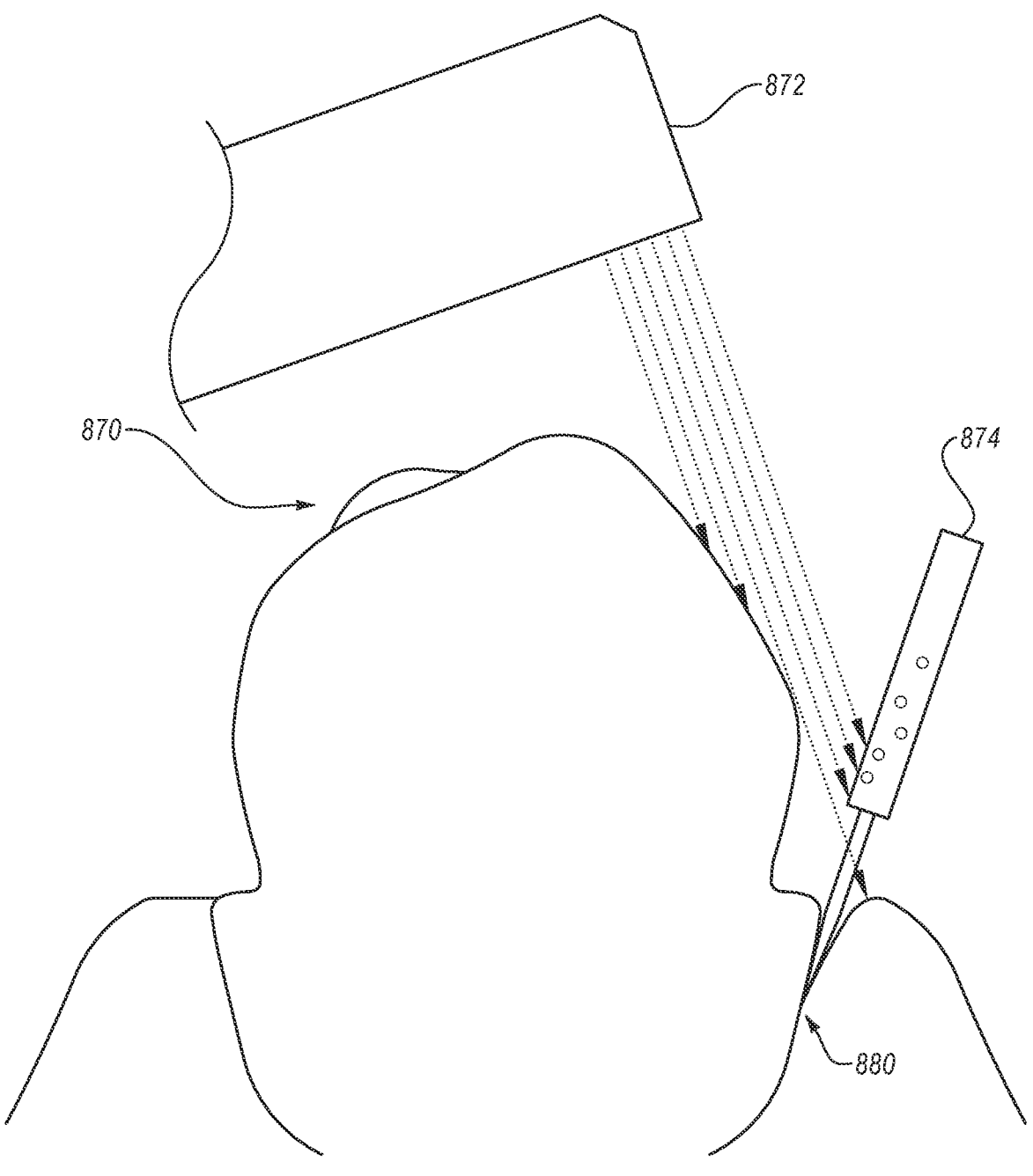
FIG. 8C illustrates scanning of a dental site and a periodontic pocket measurement tool while the tool carves out a volume of space, in accordance with an embodiment.

FIG. 8C illustrates scanning of a dental site and a periodontic pocket measurement tool while the tool carves out a volume of space, in accordance with an embodiment. In FIG. 8C, an intraoral scanner 872 outputs light (e.g., rays of light) that is reflected off of both a dental site 870 and the tool 874. Returning light reflected off of the dental site and the tool 874 is received by the intraoral scanner 872 and received at one or more image sensors for generation of intraoral scan data. Such intraoral scan data may be generated continuously as the tool 874 is moved or rotated to carve out a volume of space for a periodontic pocket 880. An intraoral scan application may process the intraoral scan data to identify the tool and determine a relative position and orientation of the tool 874 and the dental site for each intraoral scan. For each intraoral scan, processing logic may determine the volume of space occupied by the probe of tool 874 based on the relative position and orientation of the dental site and the detected features of the tool and the known relative position of the detected features of the tool and the probe of the tool. The intraoral scan application may then determine a volume of space carved out by the probe across the plurality of intraoral scans by aggregating the volumes of space occupied by the probe for each of the intraoral scans. The volume of space may define the pocket, and may include information on a depth of the pocket, a size of the pocket, and so on.

As illustrated, rays of light output by scanner 872 and rays of light are parallel. It should be noted that in embodiments the rays of light output by the scanner 872 and/or rays of returning light may not be parallel (e.g., scanners may have different ray patterns than those shown). In one embodiment, the scanner 872 may output a structured light pattern from multiple locations (e.g., multiple structured light projectors disposed at different locations on a head of intraoral scanner 872. Rays of the structured light pattern may not be parallel, and may diverge at some divergence angle or angles. The scanner 872 may additionally include multiple cameras or image sensors disposed at different positions on the head of the scanner 872, which may receive returning light from different angles, as described above with reference to FIG. 5A.

FIG. 7 illustrates a flow diagram for a method 700 of supplementing a 3D surface of a dental site based on a volume of space carved out by a tool during scanning, in accordance with an embodiment. At block 705 of method 700, processing logic receives intraoral scan data of at least a first portion of a dental site, the intraoral scan data having been generated from one or more points of view of an intraoral scanner.

At block 710, processing logic detects at least a portion of a tool in the intraoral scan data, wherein the tool comprises a probe having a known volume and a known position relative to the detected portion of the tool. The intraoral scan data may comprise a plurality of intraoral scans that were generated while the probe was moved at the location of the first portion or a second portion (e.g., that may be hidden from view) of the dental site. The probe may have been moved, for example, at a sub-gingival region of a preparation tooth, at a periodontic pocket of a tooth, at an interproximal region between teeth, and so on.

At block 715, processing logic generates a 3D surface of the dental site based on the received intraoral scan data. In particular, the processing logic may generate a 3D surface of the first portion of the dental site.

At block 720, processing logic determines a volume of space occupied by the probe across the plurality of intraoral scans based at least in part on the detected portion of the tool in the plurality of intraoral scans, the known volume of the probe, and the known position of the probe relative to the detected portion of the tool. At block 725, processing logic may determine a surface of a second portion of the dental site that is hidden from direct viewing by the intraoral scanner from the one or more points of view based at least in part on the volume of space occupied by the probe across the plurality of intraoral scans. For example, processing logic can determine that the volume of space must not be a surface of the second portion of the dental site, and that the surface of the second portion of the dental site corresponds to an outer edge of one side of the volume of space carved out by the probe.

At block 730, processing logic supplements the 3D surface of the dental site with additional surface data for the determined surface of the second portion of the dental site.

FIG. 9 illustrates a method 900 of supplementing a 3D surface of a dental site based on properties of a reflective tool, in accordance with an embodiment. The reflective tool may be a mirror or another tool that includes a reflective region. The reflective region may be flat or curved. In an example, the reflective surface of the tool may be a spherical mirror, which can provide a large field of view FOV. Operations of method 900 may be performed at block 320 of method 300 in embodiments.

At block 905 of method 900, processing logic receives intraoral scan data of at least a first portion of a dental site, the intraoral scan data having been generated from one or more points of view of an intraoral scanner. At block 910, processing logic detects at least a portion of a tool in the intraoral scan data using any of the techniques set forth herein. In embodiments, the tool comprises a reflective surface. Accordingly, rays reflected from the reflective surface that originate from a second region of the dental site that is hidden from view of the intraoral scanner may be received by an image sensor of the intraoral scanner.

At block 915, processing logic generates a 3D surface of the dental site based on the received intraoral scan data. At block 920, processing logic supplements the dental site with additional surface data of the second portion of the dental site that is hidden from direct viewing by the intraoral scanner from the one or more points of view. The additional surface data may comprise the reflection of the second portion of the dental site off of the reflective surface. In embodiments, a shape of the reflective surface is determined, and the reflection of the second portion of the dental site is processed at least in part based on the shape before it is usable to determine the surface of the second portion of the dental site. For example, if the reflective surface is a non-flat surface, then the shape of the reflective surface may be used to transform the data for the reflection so that is usable to determine the surface. In at least one embodiment, the reflection is inverted and the inverted reflection is then registered with the 3D surface.

FIG. 10 illustrates a method 1000 of supplementing a 3D surface of a dental site based on properties of a reflective tool, in accordance with an embodiment. In embodiments, method 1000 may be performed at block 320 of method 300.

At block 1005 of method 1000, processing logic determines that a detected tool has a reflective surface. The tool may have a planar reflective surface or a non-planar reflective surface. The tool may have been detected from intraoral scans of a dental site, where the tool was included in the intraoral scans. At block 1008, processing logic may optionally determine a shape of the reflective surface. Such an operation may be performed, for example, if the reflective surface is a non-planar reflective surface. At block 1010, processing logic identifies the reflective surface of the tool in the intraoral scan data. At block 1015, processing logic determines a region of the intraoral scan data associated with the reflective surface of the tool.

The reflective surface may be determined based on a known shape of the reflective surface and/or position of the reflective surface relative to detectable features (e.g., fiducials) on the tool. The reflective surface may additionally or alternatively be determined based on a border around the reflective surface. For example, the reflective surface may depict a portion of a dental site (from the reflection), but surrounding data may show no dental site regions, may show a different dental site, may show non-reflective portions of the tool, and so on. Based on this disjointed information surrounding the reflective region of the tool, the reflective region may be identified in embodiments. In some embodiments, the reflection off of the reflective region of the tool may be used without first identifying a location or shape of the reflective region. In one embodiment, if the reflected surface region is larger than a threshold size and is planar, then the reflected surface region can be registered and stitched to a 3D surface using a standard registration and stitching algorithm (after inverting the reflection near to far or front to back). In one embodiment, if the reflected surface region is smaller than a threshold size and/or is non-planar, then information about the tool is determined and used for registration and stitching of the reflected surface data to the 3D surface. This may include using the shape of the non-planar reflective surface to determine how to invert the additional surface data and to adjust magnification values for one or more points of the additional surface data.

At block 1018, processing logic may determine a position and orientation of the reflective surface to at least one of the intraoral scanner or the dental site. Such position and orientation of the reflective surface relative to the dental site and/or scanner may be used to determine angles of rays reflecting off of the reflective surface. Such angles may then be used to determine a position and/or orientation of a portion of a dental site included in a reflection relative to a portion of the dental site determined from direct line of sight viewing by the intraoral scanner.

At block 1020, processing logic inverts the surface data at the region of the intraoral scans data associated with the reflective surface of the tool. This operation is performed to reverse a national inversion of the surface data caused by the reflection.

At block 1025, processing logic registers the inverted surface data to the 3D surface generated from the intraoral scan data. At block 1030, processing logic may optionally use a known shape of the reflective surface and the position and orientation of the reflective surface relative to at least one of the intraoral scanner or the dental site to register the inverted additional surface data to the 3D surface.

Figure 11A:
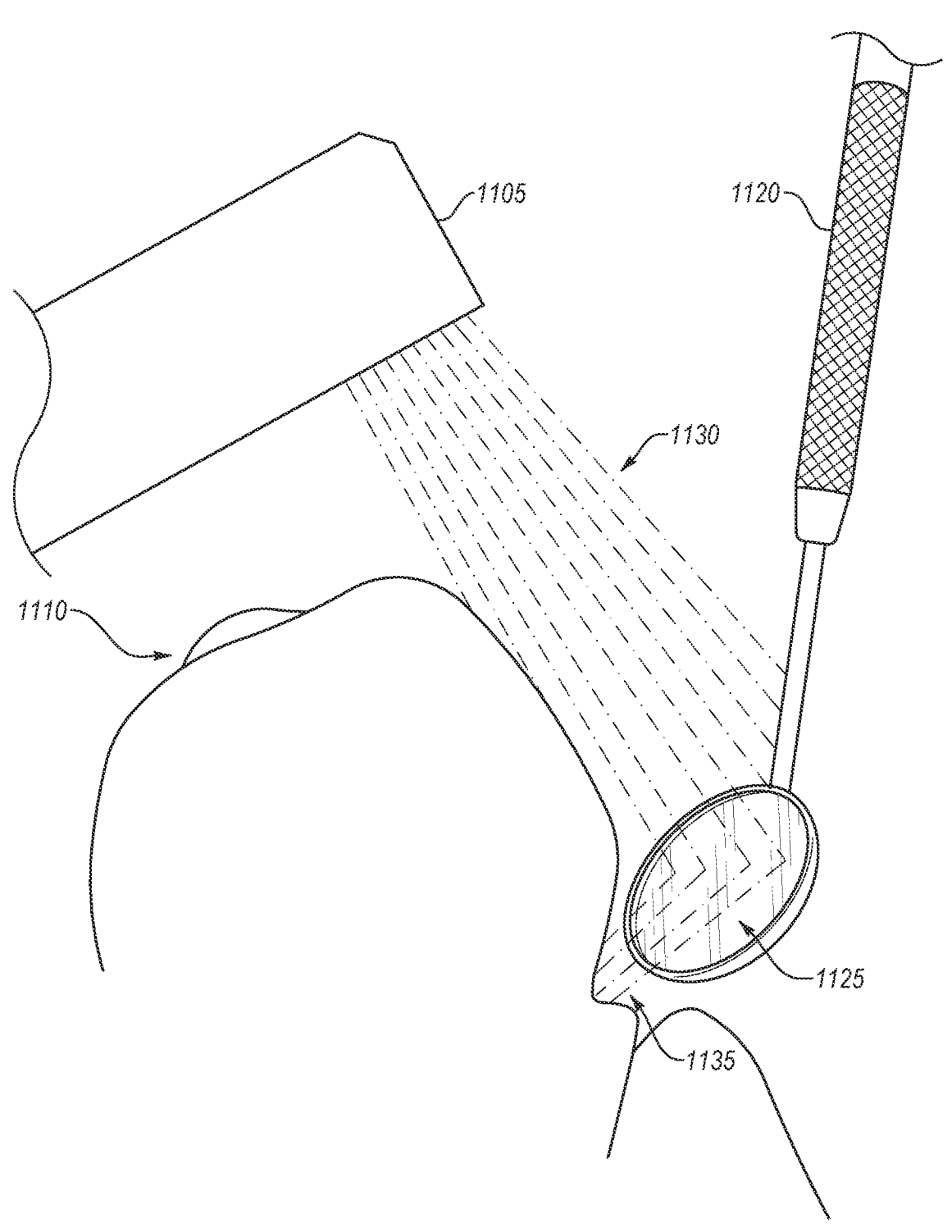
FIG. 11A illustrates scanning of a dental site and a reflective tool, in accordance with an embodiment.

FIG. 11A illustrates scanning of a dental site and a reflective tool, in accordance with an embodiment. In FIG. 11A, an intraoral scanner 1105 outputs light (e.g., rays of light) that is reflected off of both a dental site 1110 and the tool 1120. Returning light 1130 reflected off of the dental site 1110 and the tool 1120 is received by the intraoral scanner 1105 and received at one or more image sensors for generation of intraoral scan data. Such intraoral scan data may be include a reflection of a portion 1135 of the dental site that is hidden from direct view by the intraoral scanner 1105. Information for the portion 1135 of the dental site 1110 may reflect off of reflective surface 1125, and be received by intraoral scanner 1105. Additionally, intraoral scanner 1105 may receive information for non-reflective portions of the tool 1120. Such information may be used to determine contextual information about the positioning of the tool and its reflective surfaces, which may be used in determining positioning of the portion 1135 of the dental site 1110. Additionally, intraoral scanner 1105 may receive information for other regions or portions of the dental site 1110, which may be used to help determine proper positioning of the portion 1135 relative to other portions of the dental site 1110.

As illustrated, rays of light output by scanner 1105 and rays of light 1130 returning to scanner 1105 are parallel. It should be noted that in embodiments the rays of light output by the scanner 1105 and/or rays of returning light 1130 may not be parallel (e.g., scanners may have different ray patterns than those shown). In one embodiment, the scanner 1105 may output a structured light pattern from multiple locations (e.g., multiple structured light projectors disposed at different locations on a head of intraoral scanner 1105. Rays of the structured light pattern may not be parallel, and may diverge at some divergence angle or angles. The scanner 1105 may additionally include multiple cameras or image sensors disposed at different positions on the head of the scanner 1105, which may receive returning light from different angles, as described above with reference to FIG. 5A.

Figure 11B:
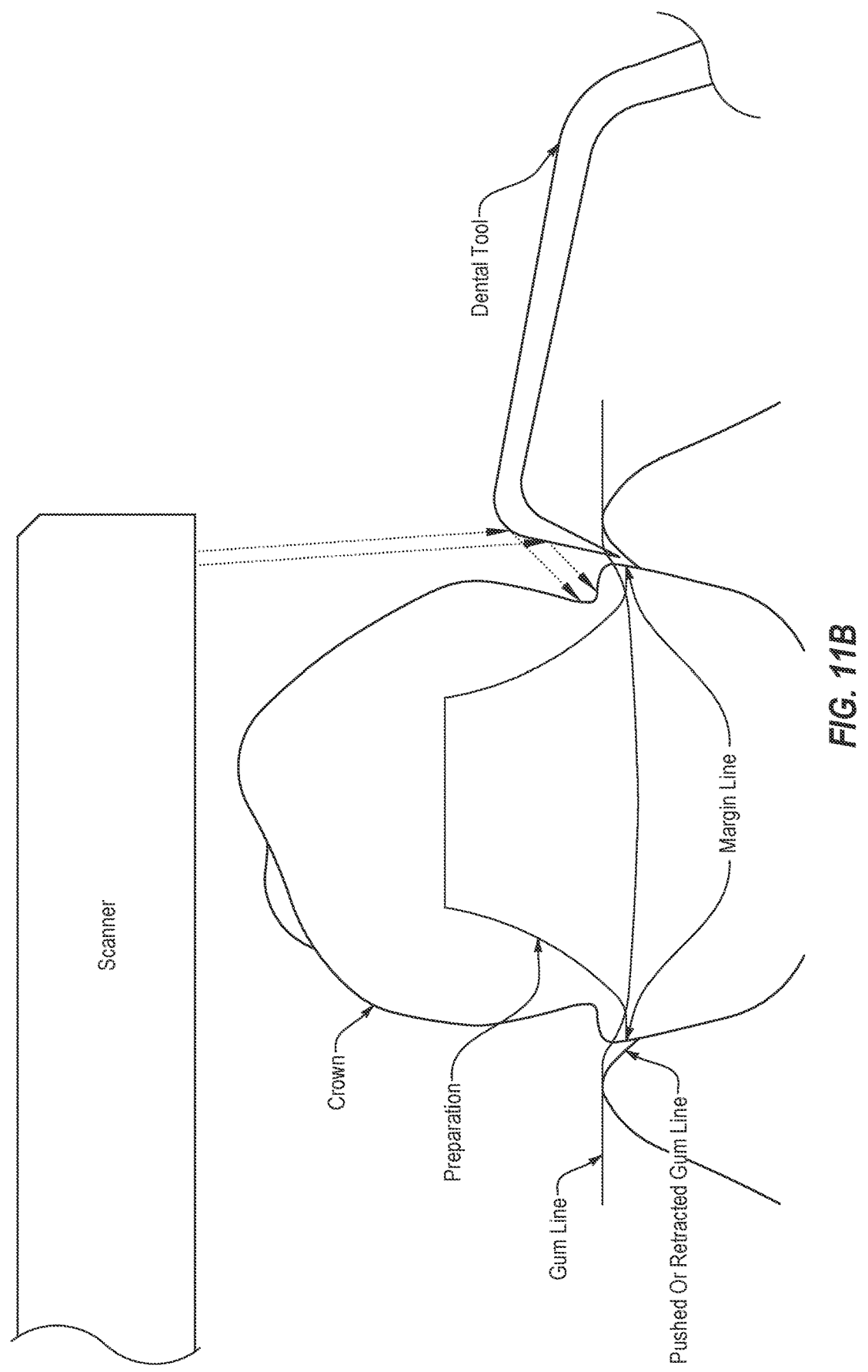
FIG. 11B illustrates scanning of a dental site and a reflective tool, in accordance with an embodiment.

FIG. 11B illustrates scanning of a dental site and a reflective tool, in accordance with an embodiment. In FIG. 11B, the reflective surface of the tool provides image data for a sub-gingival portion of a preparation tooth, such as a sub-gingival margin line of a preparation tooth. The dental tool may include a probe that can retract a portion of the patient's gingiva as well as a reflective surface that can provide a reflection of the exposed region exposed by the retraction of the patient's gingiva to the intraoral scanner.

FIG. 12 illustrates a flow diagram 1200 for a method of identifying a tool in intraoral scan data and supplementing a 3D surface based on properties of the tool, in accordance with an embodiment. At block 1210 of method 1200, processing logic receives intraoral scan data of at least a first portion of a dental site, the intraoral scan data having been generated from one or more points of view of an intraoral scanner. At block 1215, processing logic performs object recognition on the intraoral scan data to determine an identity of a tool in the intraoral scan data. Such object recognition may be performed using a trained machine learning model and/or image processing in embodiments. The object recognition may output a tool identified (ID) for the tool, for example.

At block 1220, processing logic uses the identity of the tool (e.g., tool ID) to determine a known tool shape. This may include performing a lookup into a tool library to find an entry for the identified tool. At block 1225, processing logic generates a 3D surface of the dental site based on the received intraoral scan data.

At block 1230, processing logic supplements the 3D surface of the dental site with additional surface data of a second portion of the dental site that is hidden from direct viewing by the intraoral scanner from the one or more points of view, wherein the additional surface data is based at least in part on the known shape of the tool. For example, the additional surface data may be determined based on a known shape of a reflective surface of the tool, based on a known volume and location of a probe of the tool, based on a known position of a tip of the tool relative to detectable features of the tool, and so on. In one embodiment, at block 1235 processing logic uses the known shape of the tool to fill in missing details about at least one of the dental site or the tool that are not included in the intraoral scan data. In one example, only a portion of the tool is shown, and a 3D surface of a larger portion of the tool or of all of the tool is generated based on the known shape of the tool, The 3D surface of the tool may be positioned relative to the 3D surface of the dental site based on a determined relative position and orientation of the tool and dental site as determined from the intraoral scan data.

Figure 15:
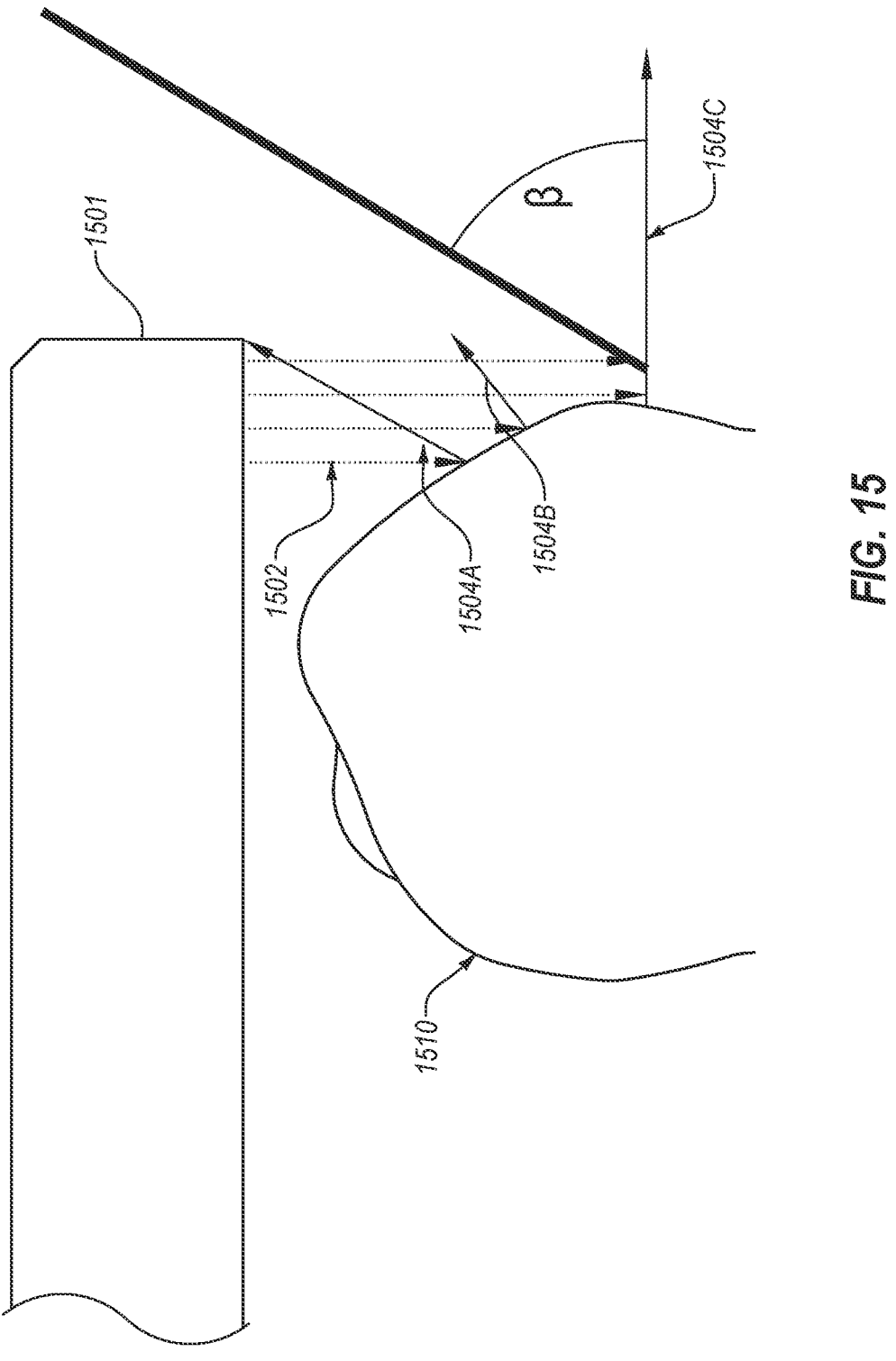
FIGS. 15-17 illustrate angles of measurement of dental sites and corresponding probability of detection, in accordance with an embodiment.
Figure 16:
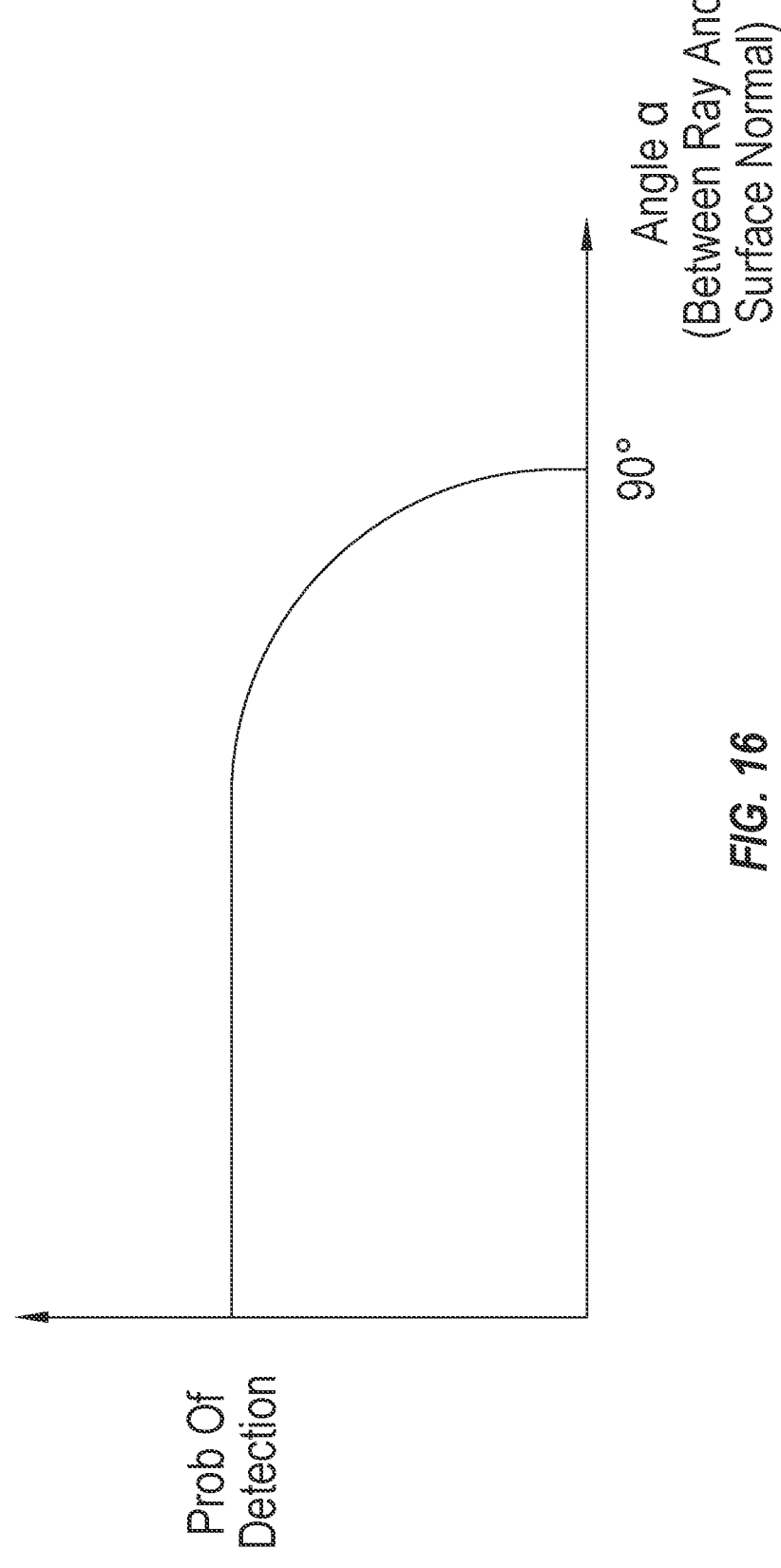

FIGS. 15-16 illustrate angles of measurement of dental sites and corresponding probability of detection, in accordance with an embodiment. In general, the quality of data (and the probability of accurate detection of 3D point positions on a surface) decrease under certain angles between a ray from the surface and a vector normal to the surface. As shown in FIG. 15, rays 1502 from or to intraoral scanner 1501 terminate at points on dental site 1510. At each intersection of a ray 1502 with a point on the dental site 1510, a vector 1504A-C normal to the surface at that point on the dental site 1510 may be determined. For each point, the angle β between the ray and a vector normal to the point on the dental site may then be determined. As this angle approaches 90 degrees, the accuracy of the measurements of the depth for the point decreases, with a lowest accuracy at about 90 degrees. FIG. 16 illustrates a relationship between probability of detection and angle between a ray and a surface normal, where the angle is represented on an x-axis and probability of detection is represented on a y-axis.

Figure 17:
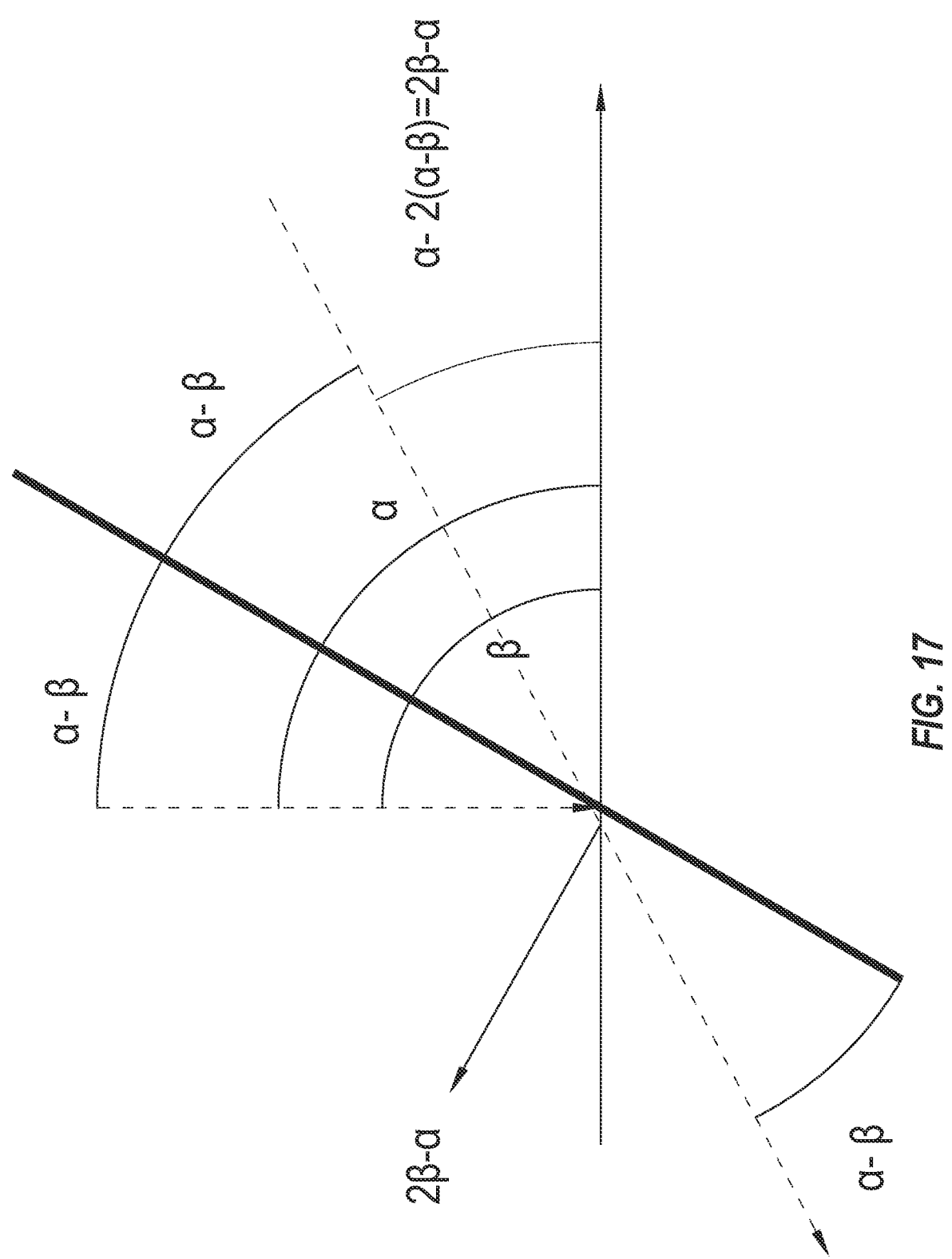

FIG. 17 illustrates angles of capture that can be achieved (between a surface normal and a ray) when a reflective surface of a dental tool is used. In FIG. 17, an original ray capture angle is a and an angle of a reflective surface of a tool is β. As shown, the angle of a new ray reflected off of the reflective surface would then be 2β−α. Accordingly, if the original ray capture angle α was 80 degrees and the angle of the tool (e.g., dental mirror) was 70 degrees, then the angle of the new ray would be 60 degrees. If the original ray capture angle α was 80 degrees and the angle of the tool (e.g., dental mirror) was 60 degrees, then the angle of the new ray would be 40 degrees. If the original ray capture angle α was 70 degrees and the angle of the tool (e.g., dental mirror) was 60 degrees, then the angle of the new ray would be 50 degrees. If the original ray capture angle α was 70 degrees and the angle of the tool (e.g., dental mirror) was 50 degrees, then the angle of the new ray would be 30 degrees. The decreased angle provides an increased probability of accurate depth detection.

In embodiments, a portion of a dental site for which an angle of incidence between imaging rays of the intraoral scanner and a vector normal to a surface of the dental site that exceeds an angle threshold is considered to be a portion of the dental site that is hidden from direct viewing by the intraoral scanner.

In some embodiments, the tool may be a specially manufactured accurate tool that does not need any calibration. In some embodiments, the tool is an off-the-shelf dental tool, and calibration may be performed to ensure that properties of the tool may be used to accurately determine surface data for hidden portions of dental sites. In some embodiments, calibration of a tool includes scanning the tool using the intraoral scanner. All sides of the tool, and any 2D and/or 3D registration features (e.g., fiducials) on the tool may be captured. A 3D surface of the tool including any registration features of the tool may then be generated. An entry may then be added to a tool library for the scanned tool, the entry optionally containing the 3D surface of the tool. The scanned tool may be assigned a tool ID. When the tool is detected in future intraoral scan data, a lookup may be performed in the tool library to obtain the stored information on the shape of the tool.

If a tool to be calibrated has one or more reflective regions, then these reflective regions may not be picked up by intraoral scanning. Accordingly, the reflective regions may be covered with a non-reflective material, such as a sticker or diffusive powder. This may enable the reflective regions to be captured by intraoral scans during calibration. In some embodiments, a user may manually trace or otherwise identify the reflective regions of a tool on a 3D surface or 3D model generated for the tool after scanning of the tool is performed during calibration. In one embodiment, the reflective regions of the tool may be pointed directly at the scanner during calibration. This would cause the scanner to pick up a reflection of the head of the scanner. The scanner head may be pre-calibrated, and detected positions of the scanner head in the scan data of the tool may be used to identify the shape and/or position of the reflective region of the tool.

In some embodiments, for calibration of a force sensitive tool a calibration shape having known surfaces with known pliability at different regions is used.

Embodiments described herein can be used to capture difficult-to-capture regions in an oral cavity. Such difficult-to-capture regions that can be accurately captured during intraoral scanning in embodiments include back wall of a back molar, interproximal spaces, gingivitis pockets, subgingival margin lines, concave inaccessible regions, drill depth, sum swelling, and caries, among others.

Figure 18:
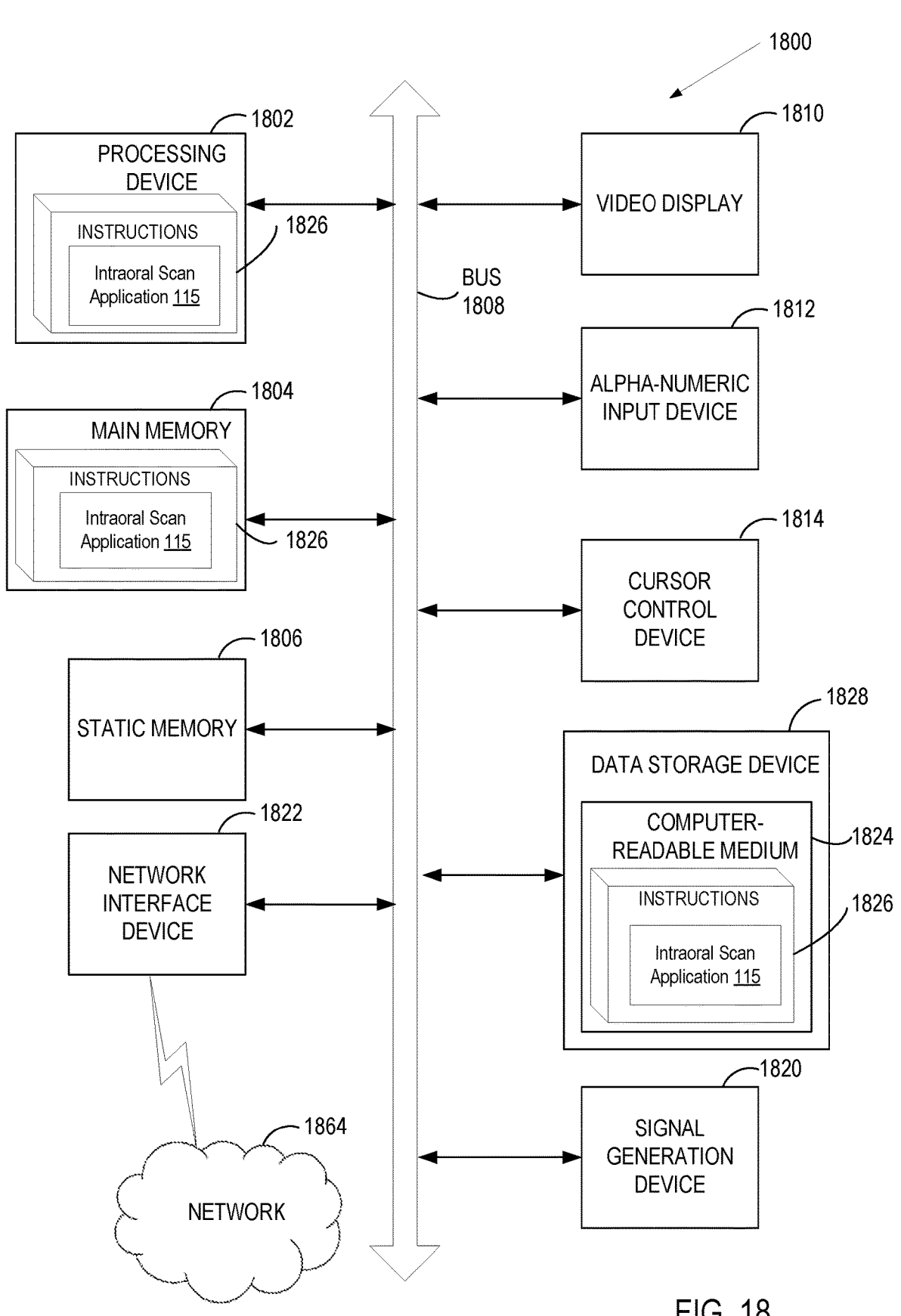
FIG. 18 illustrates a block diagram of an example computing device, in accordance with embodiments of the present disclosure.

FIG. 18 illustrates a diagrammatic representation of a machine in the example form of a computing device 1800 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The computing device 1800 may correspond, for example, to computing device 105 and/or computing device 106 of FIG. 1. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1800 includes a processing device 1802, a main memory 1804 (e.g., read-only memory (ROM), flash memory, dynamic random access memory (DRAM) such as synchronous DRAM (SDRAM), etc.), a static memory 1806 (e.g., flash memory, static random access memory (SRAM), etc.), and a secondary memory (e.g., a data storage device 1828), which communicate with each other via a bus 1808.

Processing device 1802 represents one or more general-purpose processors such as a microprocessor, central processing unit, or the like. More particularly, the processing device 1802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1802 may also be one or more special-purpose processing devices such as an application specific integrated circuit (ASIC), a field programmable gate array (FPGA), a digital signal processor (DSP), network processor, or the like. Processing device 1802 is configured to execute the processing logic (instructions 1826) for performing operations and steps discussed herein.

The computing device 1800 may further include a network interface device 1822 for communicating with a network 1864. The computing device 1800 also may include a video display unit 1810 (e.g., a liquid crystal display (LCD) or a cathode ray tube (CRT)), an alphanumeric input device 1812 (e.g., a keyboard), a cursor control device 1814 (e.g., a mouse), and a signal generation device 1820 (e.g., a speaker).

The data storage device 1828 may include a machine-readable storage medium (or more specifically a non-transitory computer-readable storage medium) 1824 on which is stored one or more sets of instructions 1826 embodying any one or more of the methodologies or functions described herein, such as instructions for intraoral scan application 115. A non-transitory storage medium refers to a storage medium other than a carrier wave. The instructions 1826 may also reside, completely or at least partially, within the main memory 1804 and/or within the processing device 1802 during execution thereof by the computer device 1800, the main memory 1804 and the processing device 1802 also constituting computer-readable storage media.

The computer-readable storage medium 1824 may also be used to store dental modeling logic 1850, which may include one or more machine learning modules, and which may perform the operations described herein above. The computer readable storage medium 1824 may also store a software library containing methods for the dental modeling logic 1850. While the computer-readable storage medium 1824 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, and other non-transitory computer readable media.

It is to be understood that the above description is intended to be illustrative, and not restrictive. Many other embodiments will be apparent upon reading and understanding the above description. Although embodiments of the present disclosure have been described with reference to specific example embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A system comprising:

an intraoral scanner; and a computing device operatively coupled to the intraoral scanner, the computing device to:

receive an indication that a tool that is mechanically independent from the intraoral scanner and that can move independently of the intraoral scanner provides supplemental surface data that will be used during intraoral scanning or determine that the tool is being used during the intraoral scanning; and implement a supplemental surface data scanning mode in which a three-dimensional (3D) surface of a dental site that is generated from intraoral scan data is supplemented with additional surface data determined based at least in part on properties of the tool and a determined position and orientation of the tool relative to the dental site as determined from the intraoral scan data, wherein the additional surface data is for a first portion of the dental site that at least one of a) is hidden from direct viewing by the intraoral scanner or b) presents a sub-optimal viewing angle to the intraoral scanner during intraoral scanning.

2. The system of claim 1, wherein the indication comprises a user input selecting the supplemental surface data scanning mode.

3. The system of claim 1, wherein the computing device is further to:

receive, from the intraoral scanner, first intraoral scan data of a dental site using a first scanning mode;

determine that the first portion of the dental site is hidden from direct view in the first intraoral scan data; and recommend that second intraoral scan data of the dental site be generated using the supplemental surface data scanning mode.

4. The system of claim 1, wherein the computing device is further to:

receive an identification of the tool that is to be used;

determine known properties of the tool; and use the known properties of the tool to provide the additional surface data.

5. The system of claim 1, wherein the computing device is further to:

receive, from the intraoral scanner, intraoral scan data of at least a second portion of the dental site, the intraoral scan data having been generated from one or more points of view of the intraoral scanner;

detect at least a portion of the tool in the intraoral scan data;

generate the 3D surface of the dental site based on the received intraoral scan data; and supplement the 3D surface of the dental site with additional surface data of the first portion of the dental site that is hidden from direct viewing by the intraoral scanner from the one or more points of view, wherein the additional surface data is based at least in part on properties of the detected tool.

6. The system of claim 5, wherein the computing device is further to:

output a view of the 3D surface of the dental site to a display, wherein a representation of the detected tool is not output to the display.

7. The system of claim 5, wherein the computing device is further to:

detect the position and orientation of the detected tool relative to the dental site.

8. The system of claim 7, wherein the computing device is further to:

generate a 3D surface of the detected tool;

display the 3D surface of the dental site; and display the 3D surface of the detected tool at the detected position and orientation relative to the 3D surface of the dental site.

9. The system of claim 8, wherein the 3D surface of the dental site is displayed using a first visualization and the 3D surface of the detected tool is displayed using a second visualization.

10. The system of claim 9, wherein the second visualization comprises a greater level of transparency than the first visualization.

11. The system of claim 5, wherein the computing device is further to:

perform object recognition on the intraoral scan data to determine an identity of the tool in the intraoral scan data; and use the identity of the tool to determine a known shape of the tool;

wherein generating the 3D surface comprises using the known shape of the tool to fill in missing details about the tool that are not included in the intraoral scan data.

12. The system of claim 11, wherein using the identity of the tool to determine the known shape of the tool comprises using the identity of the tool as an index into a library to identify an entry in the library that comprises information for the tool.

13. The system of claim 5, wherein the first portion of the dental site is obstructed from the one or more points of view by at least one of gingiva or a tooth.

14. The system of claim 5, wherein the tool comprises a tool tip having a known distance from the detected portion of the tool, wherein the intraoral scan data comprises a plurality of intraoral scans that were generated while the tool tip was moved along a surface of the first portion of the dental site, and wherein the computing device is further to:

determine a contour of the surface of the first portion of the dental site based at least in part on the detected portion of the tool in the plurality of intraoral scans and the known distance from the detected portion of the tool to the tool tip.

15. The system of claim 14, wherein the tool tip is a force sensitive tool tip, and wherein the computing device is further to:

determine measured force values as measured by the force sensitive tool tip associated with the plurality of intraoral scans; and determine a tissue type for the first portion of the dental site based on the measured force values.

16. The system of claim 15, wherein the computing device is further to:

determine a change in force between measured force values associated with sequential intraoral scans of the plurality of intraoral scans;

determine that the tissue type for the first portion of the dental site is hard tissue responsive to determining that the change in force satisfies a first criterion; and determine that the tissue type for the first portion of the dental site is soft tissue responsive to determining that the change in force satisfies a second criterion.

17. The system of claim 16, wherein the first criterion is satisfied responsive to a force change threshold being exceeded, and wherein the second criterion is satisfied responsive to the force change threshold not being exceeded.

18. The system of claim 15, wherein a first part of the first portion is determined to be hard tissue and a second part of the first portion is determined to be soft tissue.

19. The system of claim 5, wherein the tool comprises a probe having a known volume and a known position relative to the detected portion of the tool, wherein the intraoral scan data comprises a plurality of intraoral scans that were generated while the probe was moved at a location of the first portion of the dental site, and wherein the computing device is further to:

determine a volume of space occupied by the probe across the plurality of intraoral scans based at least in part on the detected portion of the tool in the plurality of intraoral scans, the known volume of the probe, and the known position of the probe relative to the detected portion of the tool; and determine a surface of the first portion of the dental site based at least in part on the volume of space occupied by the probe across the plurality of intraoral scans.

20. The system of claim 5, wherein generating the 3D surface and supplementing the 3D surface are performed while further intraoral scan data is generated by the intraoral scanner.

21. The system of claim 1, wherein the tool comprises a reflective surface, and wherein the additional surface data comprises a reflection of the first portion of the dental site off of the reflective surface.

22. The system of claim 1, wherein the tool comprises one or more known registration features that are used to determine a position and orientation of the tool relative to the dental site.

23. The system of claim 1, wherein the computing device is further to:

determine a margin line at the first portion of the dental site based on the additional surface data.

24. The system of claim 1, wherein the tool comprises a spacer used to determine an interproximal spacing between adjacent teeth, the spacer having a known thickness, and wherein the first portion of the dental site comprises the interproximal spacing between the adjacent teeth.

25. The system of claim 1, wherein the tool comprises a pocket depth measurement tool, and wherein the first portion of the dental site comprises a pocket.

26. The system of claim 1, wherein the tool is free to move relative to the dental site and relative to the intraoral scanner.

27. The system of claim 1, wherein the computing device is further to:

receive prior intraoral scan data of at least a second portion of the dental site from the intraoral scanner, the prior intraoral scan data having been generated from a point of view of the intraoral scanner;

generate an initial 3D surface of the dental site using the prior intraoral scan data;

determine that the initial 3D surface of the dental site lacks surface data for the first portion of the dental site; and recommend use of the tool to acquire the surface data for the first portion of the dental site.

28. The system of claim 1, wherein the tool and the intraoral scanner are to be inserted into an intraoral cavity of a patient at a same time.

29. A system comprising:

an intraoral scanner; and a computing device operatively coupled to the intraoral scanner, the computing device to:

receive an indication that a tool that provides supplemental surface data will be used during intraoral scanning or determine that the tool is being used during the intraoral scanning, wherein the tool comprises a planar reflective surface;

implement a supplemental surface data scanning mode in which a three-dimensional (3D) surface of a dental site that is generated from intraoral scan data is supplemented with additional surface data determined based at least in part on properties of the tool, wherein the additional surface data comprises a reflection of a first portion of the dental site off of the planar reflective surface and is for the first portion of the dental site that at least one of a) is hidden from direct viewing by the intraoral scanner or b) presents a sub-optimal viewing angle to the intraoral scanner during intraoral scanning;

determine that the intraoral scan data comprises the additional surface data;

invert the additional surface data front to back; and register the inverted additional surface data to the 3D surface without first determining a shape of the reflective surface.

30. A system comprising:

an intraoral scanner; and a computing device operatively coupled to the intraoral scanner, the computing device to:

receive an indication that a tool that provides supplemental surface data will be used during intraoral scanning or determine that the tool is being used during the intraoral scanning, wherein the tool comprises a non-planar reflective surface;

implement a supplemental surface data scanning mode in which a three-dimensional (3D) surface of a dental site that is generated from intraoral scan data is supplemented with additional surface data determined based at least in part on properties of the tool, wherein the additional surface data comprises a reflection of a first portion of the dental site off of the non-planar reflective surface and is for the first portion of the dental site that at least one of a) is hidden from direct viewing by the intraoral scanner or b) presents a sub-optimal viewing angle to the intraoral scanner during intraoral scanning;

determine that the intraoral scan data comprises the additional surface data;

determine a shape of the non-planar reflective surface;

use the shape of the non-planar reflective surface to determine how to invert the additional surface data and to adjust magnification values for one or more points of the additional surface data;

invert the additional surface data front to back;

adjust magnification values for one or more points of the additional surface data; and register the additional surface data to the 3D surface.

* * * * *